United States Patent
Araki et al.

(10) Patent No.: US 6,500,537 B1
(45) Date of Patent: Dec. 31, 2002

(54) NON-STICKING COMPOSITE MATERIALS FOR OFFICE AUTOMATION EQUIPMENT

(75) Inventors: Takayuki Araki; Yoshito Tanaka; Masahiro Kumegawa; Noritoshi Oka; Hisato Sanemasa; Tetsuo Shimizu, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/423,045

(22) PCT Filed: Apr. 27, 1998

(86) PCT No.: PCT/JP98/01940
§ 371 (c)(1),
(2), (4) Date: Jan. 21, 2000

(87) PCT Pub. No.: WO98/50229
PCT Pub. Date: Nov. 12, 1998

(30) Foreign Application Priority Data

May 1, 1997 (JP) .............................................. 9-113980

(51) Int. Cl.$^7$ ............................................. B32B 27/32
(52) U.S. Cl. ................................ 428/355 EN; 428/421; 428/521; 526/242; 526/245; 526/247; 526/206
(58) Field of Search ........................ 428/421, 355 EN, 428/521; 526/247, 242, 245, 206

(56) References Cited

U.S. PATENT DOCUMENTS

| | | |
|---|---|---|
| 4,544,720 A | 10/1985 | Ohmori et al. |
| 5,059,720 A | 10/1991 | Hung |
| 5,304,617 A | 4/1994 | Kodama et al. |
| 5,374,683 A | 12/1994 | Morgan |
| 5,570,593 A | 11/1996 | Neher et al. |
| 5,670,593 A | 9/1997 | Araki et al. |
| 5,750,626 A | 5/1998 | Shimizu et al. |
| 5,869,574 A | 2/1999 | Shimizu et al. |
| 5,986,150 A | 11/1999 | Araki et al. |
| 6,054,537 A | 4/2000 | Shimizu et al. |
| 6,069,215 A | 5/2000 | Araki et al. |
| 6,225,399 B1 | 5/2001 | Araki et al. |

FOREIGN PATENT DOCUMENTS

| | | | |
|---|---|---|---|
| JP | 2-9625 | 1/1990 | ............ B29D/29/00 |
| JP | 2-101487 | 4/1990 | ........... G03G/15/20 |
| JP | 3-24196 | 2/1991 | ......... C10M/107/00 |
| JP | 4-33904 | 2/1992 | ......... C08F/214/26 |
| JP | 5-1118 | 1/1993 | ......... C08F/214/18 |
| JP | 5-194668 | 8/1993 | ......... C08F/214/22 |
| JP | 6-8350 | 1/1994 | ............ B29D/29/00 |
| JP | 6-126896 | 5/1994 | ............ B32B/25/20 |
| JP | 6-263951 | 9/1994 | ............ C08L/27/12 |
| JP | 9-157578 | 6/1997 | ......... C09D/127/12 |
| JP | 9-157616 | 6/1997 | ........... C09J/127/12 |

OTHER PUBLICATIONS

International Preliminary Examination Report for PCT/JP98/01940.
International Search Report for PCT/JP98/01940.

*Primary Examiner*—Robert Dawson
*Assistant Examiner*—Christopher M. Keehan
(74) *Attorney, Agent, or Firm*—Sughrue Mion, PLLC

(57) ABSTRACT

A non-sticking composite material for office automation equipment which is produced by applying, to a substrate, a material comprising a fluorine-containing polymer having an excellent adhesive property to the substrate without necessitating complicated steps and is excellent in heat resistance, non-sticking property, stain-proofing property, water- and oil-repelling property, stain removing property, chemical resistance, rust-preventive property, antibacterial property, resistance to energy ray and abrasion resistance. The non-sticking composite material for office automation equipment is produced by applying, to the substrate, the material comprising a fluorine-containing ethylenic polymer having functional group which is prepared by copolymerizing (a) 0.05 to 30% by mole of at least one of fluorine-containing ethylenic monomers having at least one functional group selected from the group consisting of hydroxyl, carboxyl, a carboxylic salt group, a carboxylic ester group and epoxy, and (b) 70 to 99.95% by mole of at least one of fluorine-containing ethylenic monomers having no functional group.

22 Claims, 14 Drawing Sheets

NON-STICKING COMPOSITE MATERIALS FOR OFFICE AUTOMATION EQUIPMENT

TECHNICAL FIELD

The present invention relates to non-sticking composite materials for office automation equipment which are produced by applying, to a substrate, a fluorine-containing polymer excellent in non-sticking property, stain-proofing property, abrasion resistance, heat resistance and elasticity and particularly in adhesive property to the substrate.

In the present invention, the office automation equipment means a whole electronic business machine and its peripheral devices intended for enhancing efficiency and quality of office work, and particularly means electronic equipment such as copying machine, printer, facsimile machine, personal computer and multifunctional phone which make the best use of information processing technology.

BACKGROUND ART

Hitherto with respect to so-called office automation equipment (hereinafter simply referred to as "OA equipment") such as facsimile machine and copying machine, various materials have been used on surfaces of parts of OA equipment, for example, a fuser roller having a function to fix a toner powder electrostatically sticking on a paper by heat and pressure, a charging roller having a function to give a given amount of electrostatic charge to a surface of a photosensitive drum by using a high voltage power source, a transfer roller or transfer belt having a function to give an electrostatic charge to a paper from a high voltage power source and transfer a toner powder electrostatically sticking on a surface of a photosensitive drum to the paper and other parts to enable those parts to fully exhibit their functions.

The above-mentioned charging roller is produced by applying a chloroprene rubber or epichlorohydrin rubber to a urethane rubber substrate and thereon nylon in the form of tube which was subjected to treating with a conductivity imparting agent for adjusting conductivity and resistance from the viewpoint of imparting and regulating conductivity, making resistance uniform and making separation of paper easy. Alternatively the charging roller is used as it is without applying anything to the above-mentioned substrate. However there is a problem that a surface of the obtained roller is poor in abrasion resistance, non-sticking property against toner and paper feeding property.

Also in cases of the above-mentioned fuser roller and pressure roller, from the viewpoint of non-sticking property against toner, separation of a copying paper, elasticity and abrasion resistance, the following application methods can be considered, that is, ① a method of applying, to a metallic substrate, a tetrafluoroethylene-perfluoro(alkyl vinyl ether) copolymer (PFA) in the form of tube or coating, ② a method of applying, to a metallic substrate, a silicon rubber, fluorine-containing rubber and silicon rubber in that order and applying a silicon oil or fluorine-containing silicon oil to an outermost layer, and ③ a method of applying, to a metallic substrate, a silicon rubber or fluorine-containing rubber or further PFA in the form of tube. Thus a fluorine-containing polymer having excellent characteristics such as abrasion resistance and non-sticking property is applied to surfaces of parts of various OA equipment. However due to its excellent non-sticking property, there are problems that the fluorine-containing polymer is insufficient in adhesion to a substrate such as metal, glass or resin (excluding a fluorine-containing polymer) of the above-mentioned parts of OA equipment and causes poor processability in producing the parts and lower abrasion resistance during use, and further that non-sticking property which a fluorine-containing polymer possesses inherently is not enough against a toner and paper feeding ability is not good. Thus those problems become obstruction against an increase in operation speed of various OA equipment and enhancement of durability required therefor which comply with demands for high quality picture, coloring and increase in information processing speed as performance of OA equipment becomes high in highly developed information-intensive society of these days.

Therefore to compensate for lack of adhesion of a fluorine-containing resin, in case where the fluorine-containing polymer is used in the form of coating, there is a method of adhering a fluorine-containing resin to a substrate by roughening the surface of metal chemically or physically with expecting anchor effect between them. However this method requires much labor in the surface roughening itself, and though initial adhesion is possible, lowering of the anchor effect arises when a temperature change is made repeatedly and in case of use at high temperature.

Also a method for chemically activating a surface of a fluorine-containing resin by treating the surface with a solution prepared by dissolving metallic sodium in liquid ammonia has been proposed. However in that method, not only there is a fear that the solution itself causes environmental pollution but also there is a problem that its handling is attended with danger.

Further though a method for carrying out physical and chemical treatment such as plasma sputtering on a surface of a fluorine-containing resin has been proposed for activation of the resin surface, there is a problem that much labor is required for the treatment and an increase in cost is resulted.

Also in order to improve adhesion of a fluorine-containing resin coating, investigations with respect to addition of various components and formation of a primer layer have been made.

For example, there is a technique of adding an inorganic acid such as chromic acid to a coating composition containing a fluorine-containing resin to form chemical conversion coating film on a surface of metal for enhancing adhesion of the composition (JP-B-63-2675). However since chromic acid contains hexahydric chromium, it cannot be said that such a technique is sufficient in view of safety in food and coating work. Further in case of use of other inorganic acids such as phosphoric acid, there was a problem that safety of a fluorine-containing resin coating composition is damaged.

Use of a coating composition containing a fluorine-containing resin as a primer, in which heat resistant resins such as polyamide imide, polyimide, polyethersulfone and polyether ether ketone and in addition, a metal powder are added instead of the above-mentioned inorganic acid, has been studied (JP-A-6-264000). Inherently there is almost no compatibility between a fluorine-containing resin and a heat resistant resin. Therefore there arises a phase separation in a coating film, thus easily causing intercoat adhesion failure between the primer and the top coat of the fluorine-containing resin. Further film defects such as pin holes and cracks arise easily at the time of processing at high temperature or during use due to a difference in heat shrinkage between the fluorine-containing resin and the heat resistant resin or due to lowering of elongation of the coating film by the addition of the heat resistant resin. Also since those heat resistant resins are colored brown by baking, property for exhibiting clear surface pattern is poor and it is difficult to use them for applications requiring white and vivid colors and transparency. Further when the heat resistant resin is blended, non-sticking property and friction resistance which the fluorine-containing resin inherently possesses are lowered.

Also for adhesion of a fluorine-containing resin coating composition to a glass, etc. requiring transparency, an improvement of the adhesion has been tried by treating the substrate with a silane coupling agent or adding a silicone resin to the fluorine-containing resin coating composition (JP-B-54-42366, JP-A-5-177768). However enhancement of adhesion is insufficient, heat resistance is lowered and separation of a coating film, foaming and coloring arise easily at sintering or in use at high temperature.

On the contrary, fluorine-containing resin coating compositions prepared by copolymerizing a hydrocarbon monomer (containing no fluorine) containing functional group such as hydroxyl or carboxyl have been discussed. However since those coating compositions were originally studied mainly for a purpose of weather resistance, it is difficult to use them for application requiring heat resistance for 200° to 350° C. and for applications requiring non-sticking property and friction resistance.

Namely with respect to a polymer prepared by copolymerizing a hydrocarbon monomer (containing no fluorine) having functional group, thermal decomposition easily occurs on components of the monomer at the time of processing at high temperature or during use, and thus coating film failure, coloring, foaming, separation, etc. arise, which makes it impossible to attain purposes of coating a fluorine-containing resin.

Further fluorine-containing resins are generally insufficient in mechanical strength and dimensional stability, and high in price. In order to minimize those disadvantages and make the best use of the above-mentioned merits which the fluorine-containing polymer possesses inherently, investigations have been made also with respect to its use in the form of film.

However the fluorine-containing resin inherently has low adhesive force, and it is difficult to adhere the fluorine-containing polymer in the form of a film directly to other material (substrate). For example, even if the adhering is tried by thermo-processing, adhesive strength of the fluorine-containing polymer is not enough, or even if the polymer has adhesive force to a certain extent, such an adhesive force is apt to vary depending on kind of the substrate. Thus in many cases, reliability on the adhesive strength of the fluorine-containing polymer has been not so enough.

In order to adhere the fluorine-containing resin film to a substrate, mainly the following methods have been studied:
1. a method for physically roughening a surface of substrate by sand blasting, etc.,
2. a method for surface-treating a fluorine-containing resin film by chemical treatment such as sodium etching, plasma treatment, photochemical treatment, etc.,
3. a method for adhering by using an adhesive, and other methods. With respect to the methods 1 and 2 above, surface-treating steps are required, and the steps are complicated and productivity is poor. Also kinds and shapes of substrates are restricted. Further the obtained adhesive force is insufficient, and also there easily occur a problem with appearance (property for exhibiting clear surface pattern) of the obtained composite materials such as coloring and color. Also the method of using a chemical such as sodium etching has a problem with safety.

Use of an adhesive in the method 3 above has also been discussed. A usual hydrocarbon type (containing no fluorine) adhesive does not have enough adhesive property and its heat resistance is insufficient. Thus a hydrocarbon type adhesive cannot stand under conditions for adhering of a fluorine-containing polymer film which requires molding and processing at high temperature, and peeling due to decomposition of the adhesive and coloring occur. Since an adhesive layer of the above-mentioned laminated article produced by using an adhesive also is insufficient in heat resistance, chemical resistance and water resistance, it cannot maintain adhesive force due to a change in temperature and environment, and lacks in reliability.

On the contrary, adhesion by using an adhesive composition comprising a fluorine-containing polymer having functional group is discussed.

For example, it is reported that a fluorine-containing polymer prepared by graft-polymerizing, to the fluorine-containing polymer, a hydrocarbon monomer which has carboxyl represented by maleic anhydride and vinyltrimethoxysilane, a residual group of carbonic acid, epoxy or a hydrolyzable silyl group, is used as an adhesive (for example, JP-A-7-18035, JP-A-7-25952, JP-A-7-25954, JP-A-7-173230, JP-A-7-173446, JP-A-7-173447) and that an adhesive composition comprising a fluorine-containing copolymer prepared by copolymerizing a hydrocarbon monomer having functional group such as hydroxyalkyl vinyl ether with tetrafluoroethylene or chlorotrifluoroethylene and an isocyanate hardening agent is cured and used as an adhesive between vinyl chloride resin and corona-discharged ETFE (for example, JP-A-7-228848).

The above-mentioned adhesive composition comprising a fluorine-containing resin prepared by graft-polymerizing or copolymerizing a hydrocarbon monomer having functional group does not have enough heat resistance, and thus at the time of processing a composite material comprising the adhesive composition and a fluorine-containing resin film at high temperature or during use at high temperature, decomposition and foaming occur, thereby causing reduction of adhesive strength, peeling and coloring. In case of the adhesive composition disclosed in JP-A-7-228848, it is necessary to corona-discharge the fluorine-containing resin film.

As mentioned above, no non-sticking composite materials for parts of OA equipment which meet all the above-mentioned requirements and assure strong adhesion to a substrate have been obtained.

In view of the above-mentioned facts, an object of the present invention is to provide non-sticking composite materials for OA equipment which are produced by applying, to a substrate, a material comprising a fluorine-containing polymer being excellent in adhesion to the substrate without necessitating complicated steps and can be used for various parts of OA equipment.

Further an object of the present invention is to obtain the non-sticking composite materials for OA equipment excellent in non-sticking property, abrasion resistance, durability, elasticity, stain-proofing property and sliding property.

DISCLOSURE OF THE INVENTION

The present invention relates to non-sticking composite materials for office automation equipment which are produced by applying, to a substrate, a material comprising a fluorine-containing ethylenic polymer having functional group and prepared by copolymerizing:
(a) 0.05 to 30% by mole of at least one of fluorine-containing ethylenic monomers having at least one functional group selected from the group consisting of hydroxyl, carboxyl, a carboxylic salt group, a carboxylic ester group and epoxy and (b) 70 to 99.95% by mole of at least one of fluorine-containing ethylenic monomers having no functional group mentioned above.

In that case, it is preferable that the above-mentioned fluorine-containing ethylenic monomer (a) having functional group is at least one of fluorine-containing ethylenic monomers represented by the formula (1):

wherein Y is —CH$_2$OH, —COOH, a carboxylic salt group, a carboxylic ester group or epoxy, X and X$^1$ are the same or different and each is hydrogen atom or fluorine atom, R$_f$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

Further it is preferable that the fluorine-containing ethylenic monomer (b) having no functional group mentioned above is tetrafluoroethylene.

Further it is preferable that the fluorine-containing ethylenic monomer (b) having no functional group mentioned above is a monomer mixture of 85 to 99.7% by mole of tetrafluoroethylene and 0.3 to 15% by mole of a monomer represented by the formula (2):

wherein R$_f^1$ is CF$_3$ or OR$_f^2$, in which R$_f^2$ is a perfluoroalkyl group having 1 to 5 carbon atoms.

Further it is preferable that the fluorine-containing ethylenic monomer (b) having no functional group mentioned above is a monomer mixture comprising 40 to 80% by mole of tetrafluoroethylene, 20 to 60% by mole of ethylene and 0 to 15% by mole of other monomer copolymerizable with those monomers.

In the present invention, it is also preferable that the fluorine-containing ethylenic polymer having functional group is prepared by copolymerizing:

(a) 0.01 to 30% by mole of the fluorine-containing ethylenic monomer having functional group with (b) 99.95 to 70% by mole of a monomer mixture comprising 40 to 90% by mole of vinylidene fluoride, 0 to 30% by mole of tetrafluoroethylene and 10 to 50% by mole of hexafluoropropene on the basis of a total amount of monomers excluding the monomer (a), a monomer mixture comprising 40 to 70% by mole of tetrafluoroethylene, 30 to 60% by mole of propylene and 0 to 20% by mole of other monomer copolymerizable therewith on the basis of a total amount of monomers excluding the monomer (a) or a monomer mixture comprising 40 to 85% by mole of tetrafluoroethylene and 15 to 60% by mole of perfluoro (vinyl ether) on the basis of a total amount of monomers excluding the monomer (a).

In the present invention, it is preferable that the fluorine-containing ethylenic polymer having functional group is applied to a substrate in the form of a coating composition.

Further it is preferable that the fluorine-containing ethylenic polymer having functional group is applied to a substrate in the form of a film.

It is preferable that the substrate is a metallic substrate.

It is preferable that the substrate is a synthetic resin substrate.

It is preferable that the substrate is a glass substrate.

It is preferable that the substrate is a metallic substrate comprising an aluminum-based metal.

It is preferable that the substrate is a metallic substrate and the above-mentioned material is applied with a layer of elastic member being inserted between the substrate and the material.

It is preferable that the layer of elastic member comprises a silicone rubber.

Also it is preferable that the layer of elastic member comprises a fluorine-containing rubber.

It is preferable that the synthetic resin substrate is made of polyimide.

Also it is preferable that the synthetic resin substrate is made of a heat resisting thermoplastic resin.

It is preferable that the heat resisting thermoplastic resin is polyphenylene sulfide.

Also it is preferable that the heat resisting thermoplastic resin is polyamide imide.

Also it is preferable that the heat resisting thermoplastic resin is polyetherimide.

The present invention relates to rollers for office automation equipment which are produced by using the above-mentioned non-sticking composite materials for office automation equipment.

In that case, it is preferable that the fluorine-containing ethylenic polymer having functional group is applied to a substrate in the form of a coating composition.

Further it is preferable that the fluorine-containing ethylenic polymer having functional group is applied to a substrate in the form of a tube.

Further the present invention relates to a fuser roller produced by using the non-sticking composite materials for office automation equipment.

Further the present invention relates to a pressure roller produced by using the non-sticking composite materials for office automation equipment.

Further the present invention relates to a charging roller produced by using the non-sticking composite materials for office automation equipment.

The present invention relates to a transfer roller produced by using the non-sticking composite materials for office automation equipment.

The present invention relates to belts for office automation equipment which are produced by using the non-sticking composite materials for office automation equipment.

The present invention relates to belts for office automation equipment which are produced by using the non-sticking composite materials for office automation equipment, in which the fluorine-containing ethylenic polymer having functional group is applied to a substrate in the form of a coating composition.

The present invention relates to belts for office automation equipment which are produced by using the non-sticking composite materials for office automation equipment, in which the fluorine-containing ethylenic polymer having functional group is applied to a substrate in the form of a film.

The present invention relates to belts for office automation equipment which are produced by using the non-sticking composite materials for office automation equipment.

The present invention relates to a transfer belt produced by using the non-sticking composite materials for office automation equipment.

The present invention relates to sliding parts for office automation equipment which are produced by using the non-sticking composite materials for office automation equipment.

The present invention relates to sliding parts for office automation equipment which are produced by using the non-sticking composite materials for office automation equipment, in which the fluorine-containing ethylenic polymer having functional group is applied to a substrate in the form of a coating composition.

The present invention relates to sliding parts for office automation equipment which are produced by using the non-sticking composite materials for office automation equipment, in which the fluorine-containing ethylenic polymer having functional group is applied to a substrate in the form of a film.

In those cases, it is preferable that the substrate is made of polyphenylene sulfide, polyamide imide or polyetherimide.

Also the present invention relates to a separating claw produced by using the non-sticking composite materials for office automation equipment.

Also the present invention relates to a fixing bearing produced by using the non-sticking composite materials for office automation equipment.

Also the present invention relates to a paper delivery roller produced by using the non-sticking composite materials for office automation equipment.

Also the present invention relates to a paper delivery guide produced by using the non-sticking composite materials for office automation equipment.

BEST MODE FOR CARRYING OUT THE INVENTION

Figure 1:
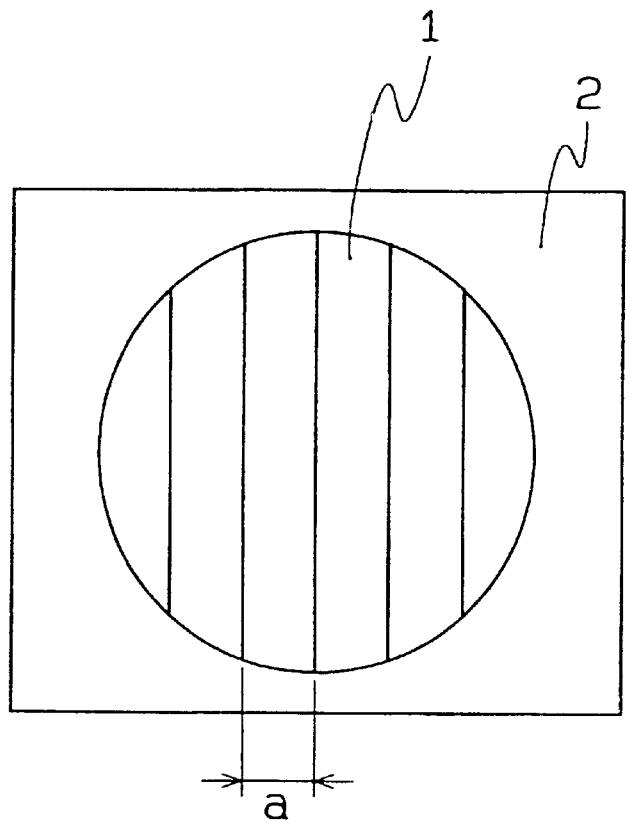
FIG. 1 is a diagrammatic plan view of an adhered sample made to measure adhesive strength in Example 7 of the present invention.

The non-sticking composite material for OA equipment of the present invention is one produced by applying, to a substrate, a material comprising a fluorine-containing ethylenic polymer having functional group and prepared by copolymerizing:

(a) 0.05 to 30% by mole of at least one of fluorine-containing ethylenic monomers having at least one functional group selected from the group consisting of hydroxyl, carboxyl, a carboxylic salt group, a carboxylic ester group and epoxy and (b) 70 to 99.95% by mole of at least one of fluorine-containing ethylenic monomers having no functional group mentioned above.

The above-mentioned material comprising a fluorine-containing ethylenic polymer having functional group has surprisingly strong adhesion in the form of coating or film to metal, glass and other substrates even without use of an adhesive, surface-treatment on the substrate, formation of a primer layer and addition of a component having adhesive property in the material.

With respect to the fluorine-containing ethylenic polymer having functional group which is used for preparing the composite material of the present invention, it is important to copolymerize (a) the above-mentioned fluorine-containing ethylenic monomer having functional group and (b) the fluorine-containing ethylenic monomers having no functional group mentioned above to introduce the functional group into the fluorine-containing polymer, thereby making it possible to give excellent adhesive force directly to surfaces of various substrates, to which adhesion has been difficult or impossible. Namely as compared with a fluorine-containing polymer prepared by copolymerizing a non-fluorine-containing monomer having functional group, the fluorine-containing polymer of the present invention is excellent in heat resistance, and decomposition at processing at high temperature (for example, 200° to 400° C.) can be inhibited more and a large adhesive strength can be obtained. Further a coating layer being free from coloring, foaming, pin hole caused thereby and leveling failure can be formed on a substrate. Also in case where the composite material is used at high temperature, adhesive property is maintained and a coating layer failure such as coloring, whitening, foaming or pin hole is difficult to arise.

The above-mentioned fluorine-containing polymer having functional group has excellent characteristics such as not only heat resistance thereof but also chemical resistance, non-sticking property, stain-proofing property, friction resistance and weather resistance of a fluorine-containing polymer and can give such excellent characteristics to a coating film without lowering them.

Then the fluorine-containing ethylenic copolymer having functional group which is a material for the composite material of the present invention is explained below.

The functional group of the fluorine-containing ethylenic polymer having functional group is at least one functional group selected from the group consisting of hydroxyl, carboxyl, a carboxylic salt group, a carboxylic ester group and epoxy, and provides the polymer with adhesion to various substrates by its effect. Kinds and combination of the functional groups are optionally selected depending on kind of a surface of the substrate and purpose and application. From the viewpoint of heat resistance, hydroxyl is most preferable.

Examples of the preferred fluorine-containing ethylenic monomer (a) having functional group which is one of components constituting the fluorine-containing ethylenic polymer having functional group are fluorine-containing ethylenic monomers having functional group which are represented by the formula (1):

$$CX_2=CX^1-R_f-Y \qquad (1)$$

wherein Y is —CH$_2$OH, —COOH, a carboxylic salt group, a carboxylic ester group or epoxy, X and X$^1$ are the same or different and each is hydrogen atom or fluorine atom, R$_f$ is a divalent alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

Examples of the fluorine-containing ethylenic monomer (a) having functional group are one represented by the formula (3):

$$CF_2=CF-R_f^3-Y \qquad (3)$$

wherein Y is as defined in the above formula (1), R$_f^3$ is a divalent fluorine-containing alkylene group having 1 to 40 carbon atoms or OR$_f^4$, in which R$_f^4$ is a divalent fluorine-containing alkylene group having 1 to 40 carbon atoms or a divalent fluorine-containing alkylene group having ether bond and 1 to 40 carbon atoms, one represented by the formula (4):

$$CF_2=CFCF_2-OR_f^5-Y \qquad (4)$$

wherein Y is as defined in the above formula (1), R$_f^5$ is a divalent fluorine-containing alkylene group having 1 to 39 carbon atoms or a divalent fluorine-containing alkylene group having ether bond and 1 to 39 carbon atoms, one represented by the formula (5):

$$CH_2=CFCF_2-R_f^6-Y \qquad (5)$$

wherein Y is as defined in the above formula (1), R$_f^6$ is a divalent fluorine-containing alkylene group having 1 to 39 carbon atoms or OR$_f^7$, in which R$_f^7$ is divalent fluorine-containing alkylene group having 1 to 39 carbon atoms or a divalent fluorine-containing alkylene group having ether bond and 1 to 39 carbon atoms, one represented by the formula (6):

$$CH_2=CH-R_f^8-Y \qquad (6)$$

wherein Y is as defined in the above formula (1), R$_f^8$ is a divalent fluorine-containing alkylene group having 1 to 40 carbon atoms, or the like monomer.

From the viewpoint that copolymerizability with the fluorine-containing ethylenic monomer (b) having no functional group mentioned above is comparatively good and that heat resistance of the obtained polymer is not lowered remarkably, the fluorine-containing ethylenic monomers having functional group and represented by the formulae (3) to (6) are preferable.

Among them, from the viewpoint of copolymerizability with the fluorine-containing ethylenic monomer (b) having no functional group mentioned above and heat resistance of the obtained polymer, the compounds of the formulae (3) and (5) are preferable, and the compound of the formula (5) is particularly preferable.

Examples of the fluorine-containing ethylenic monomer having functional group and represented by the formula (3) are:

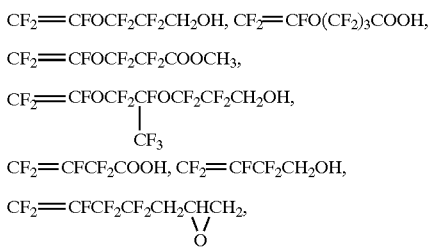

and the like.

Examples of the fluorine-containing ethylenic monomer having functional group and represented by the formula (4) are:

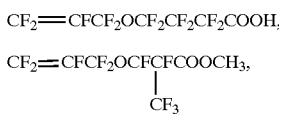

and the like.

Examples of the fluorine-containing ethylenic monomer having functional group and represented by the formula (5) are:

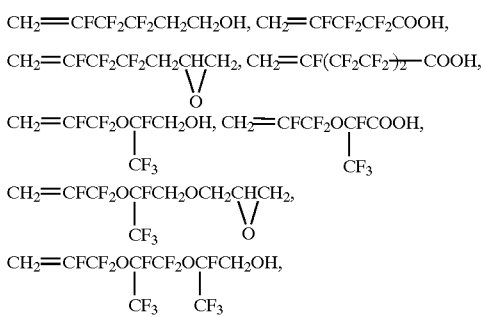

and the like.

Examples of the fluorine-containing ethylenic monomer having functional group and represented by the formula (6) are:

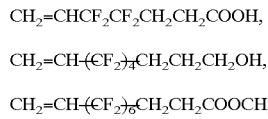

and the like.

In addition, there are

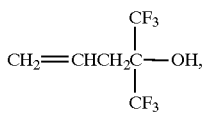

and the like.

The fluorine-containing ethylenic monomer (a) having functional group is copolymerized with the fluorine-containing ethylenic monomer (b) having no functional group which the monomer (a) has. The fluorine-containing ethylenic monomer (b) is preferably selected from monomers having no functional group. The monomer (b) can be optionally selected from known monomers, and gives the polymer heat resistance, non-sticking property, stain-proofing property and friction resistance in addition to excellent chemical resistance.

Examples of the fluorine-containing ethylenic monomer (b) are tetrafluoroethylene, a monomer represented by the formula (2): $CF_2=CF-R_f^1$, wherein $R_f^1$ is $CF_3$ or $OR_f^2$, in which $R_f^2$ is a perfluoroalkyl group having 1 to 5 carbon atoms,

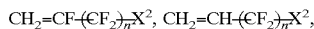

wherein $X^2$ are selected from hydrogen atom, chlorine atom and fluorine atom, n is an integer of 1 to 5, and the like.

In addition to the fluorine-containing ethylenic monomer (a) having functional group and the fluorine-containing ethylenic monomer (b) having no functional group mentioned above, an ethylenic monomer having no fluorine atom may be copolymerized in the range of not lowering heat resistance and non-sticking property. In that case, it is preferable that the ethylenic monomer having no fluorine atom is selected from ethylenic monomers having not more than 5 carbon atoms in order not to lower heat resistance. Examples of such an ethylenic monomer are ethylene, propylene, 1-butene, 2-butene, and the like.

A content of the fluorine-containing ethylenic monomer (a) having functional group in the fluorine-containing ethylenic polymer having functional group which is used in the present invention is from 0.05 to 30% by mole on the basis of the total amount of monomers in the polymer. The content is optionally selected depending on kind of the surface of a substrate for OA equipment, shape of the substrate, coating method, film forming method and conditions and further depending on purposes and applications. The content of the fluorine-containing ethylenic monomer (a) having functional group is preferably from 0.05 to 20% by mole, particularly preferably from 0.1 to 10% by mole.

When the content of the fluorine-containing ethylenic monomer (a) having functional group is less than 0.05% by mole, sufficient adhesion to the substrate surface is difficult to obtain, and separation easily occurs due to temperature change and permeation of chemicals. When more than 30% by mole, heat resistance is lowered and there occur adhesion failure, coloring, foaming and pin hole at sintering at high temperature or during use at high temperature, thus easily lowering property for exhibiting clear surface pattern and causing separation of a coating layer and elution due to decomposition.

Examples of the preferred fluorine-containing ethylenic polymer having functional group used in the present invention are as follows.

(I) A polymer comprising 0.05 to 30% by mole of the fluorine-containing ethylenic monomer (a) having functional group and 70 to 99.95% by mole of tetrafluoroethylene (reactive PTFE).

The polymer is the most excellent in heat resistance, chemical resistance and non-sticking property, and further is superior from the viewpoint of sliding property (friction resistance, abrasion resistance).

(II) A polymer comprising 0.05 to 30% by mole of the fluorine-containing ethylenic monomer (a) having functional group based on the total amount of monomers, and further based on the total amount of monomers excluding the monomer (a), 85 to 99.7% by mole of tetrafluoroethylene and 0.3 to 15% by mole of the monomer represented by the formula (2):

$$CF_2=CF-R_f^1 \qquad (2)$$

wherein $R_f^1$ is $CF_3$ or $OR_f^2$, in which $R_f^2$ is a perfluoroalkyl group having 1 to 5 carbon atoms. For example, there is a tetrafluoroethylene-perfluoro(alkyl vinyl ether) copolymer having functional group (reactive PFA) or a tetrafluoroethylene-hexafluoropropylene polymer having functional group (reactive FEP).

The polymer has heat resistance, chemical resistance and non-sticking property nearly equivalent to those of the above-mentioned reactive PTFE (I), and further is superior from the points of possessing transparency and being melt-processable and from the viewpoint that even when coated in the form of coating, it is possible to make the coating film transparent and its surface smooth by heat.

(III) A polymer comprising 0.05 to 30% by mole of the fluorine-containing ethylenic monomer (a) having functional group based on the total amount of monomers, and further based on the total amount of monomers excluding the monomer (a), 40 to 80% by mole of tetrafluoroethylene, 20 to 60% by mole of ethylene and 0 to 15% by mole of other copolymerizable monomer (ethylene-tetrafluoroethylene polymer having functional group (reactive ETFE)).

The polymer is superior from the viewpoint of excellent heat resistance, non-sticking property, stain-proofing property, weather resistance and transparency, and further excellent mechanical strength, hardness and rigidity and from the point that molding and combining with other substrate (lamination, etc.) are easy because of good melt-flowability.

(IV) A polymer comprising 0.05 to 30% by mole of the fluorine-containing total amount of monomers, and further based on the total amount of monomers excluding the monomer (a), a monomer mixture of 40 to 90% by mole of vinylidene fluoride, 0 to 30% by mole of tetrafluoroethylene and 10 to 50% by mole of hexafluoropropene, a monomer mixture of 40 to 70% by mole of tetrafluoroethylene, 30 to 60% by mole of propylene and 0 to 20% by mole of other copolymerizable monomer or a monomer mixture of 40 to 85% by mole of tetrafluoroethylene and 15 to 60% by mole of perfluoro(vinyl ether) (reactive fluorine-containing rubber).

The polymer is preferred from the viewpoint of excellent heat resistance, non-sticking property and stain-proofing property and from the points that elasticity and flexibility can be given to a molded article, that particularly in case of use for rollers of OA equipment, a vivid picture can be obtained without deformation of a toner and blotting and that the polymer is applicable to a soft toner for color printing.

The above-mentioned fluorine-containing ethylenic polymers having functional group can be prepared by copolymerizing the fluorine-containing ethylenic monomer (a) having functional group and the fluorine-containing ethylenic monomer (b) having no functional group through known polymerization methods. Among them, radical copolymerization method is mainly used. Namely means for initiating the polymerization is not particularly limited if the polymerization advances radically. For example, the polymerization is initiated by an organic or inorganic radical polymerization initiator, heat, light, ionizing radiation, etc. The polymerization can be carried out by solution polymerization, bulk polymerization, suspension polymerization, emulsion polymerization, or the like. A molecular weight of the polymer is regulated by a concentration of the monomers used in the polymerization, a concentration of the initiator, a concentration of a chain transfer agent and polymerization temperature. Amounts of components of the prepared copolymer can be regulated by amounts of monomers used.

The fluorine-containing ethylenic polymer having functional group and explained above can be made into various forms as a material to be applied to a substrate. Represented examples of its application are a coating material or a material in the form of film. The polymer may be formed into a molded article in the form of sheet or tube.

In the present invention, the above-mentioned fluorine-containing ethylenic polymer having functional group can be applied to a substrate in the form of coating to give a composite material for OA equipment.

In the present invention, in case of use in the form of coating, the polymer is capable of being in the form of aqueous dispersion, organic solvent dispersion, organic solvent soluble material, powder (including granulate), organosol or an aqueous emulsion of organosol. Among them, from environmental and safety points of view, it is preferable to apply in the form of an aqueous dispersion or powder (powder coating).

The coating may be applied so that excellent adhesive property of the fluorine-containing ethylenic polymer having functional group to the substrate is exhibited. The coating may be applied in one layer or as a primer.

In the present invention, the aqueous dispersion for fluorine-containing coating composition is prepared by dispersing, in water, particles of the above-mentioned fluorine-containing ethylenic polymer having functional group. By introducing a functional group in the fluorine-containing polymer, dispersion stability of fine particles in the aqueous dispersion is enhanced and a coating composition having good storage stability can be obtained, and further leveling property and transparency of a coating film are enhanced.

As the fluorine-containing ethylenic polymer having functional group, from the viewpoint of heat resistance, non-sticking property and friction resistance, the reactive PTFE (I) is preferred, from the viewpoint of heat resistance and non-sticking property, the reactive PFA or reactive FEP (II) is preferred and from the viewpoint of heat resistance, non-sticking property and elasticity, the reactive fluorine-containing rubber (IV) is preferred.

The above-mentioned aqueous dispersion is preferably in a state of 0.01 to 1.0 $\mu$m fine particles of the polymer being dispersed in water. Usually a surfactant may be blended in the aqueous dispersion for the purpose of dispersion stability. Also to the aqueous dispersion can be added additives to be used usually such as pigment, surfactant, anti-foaming agent, viscosity control agent and leveling agent in amounts not lowering remarkably heat resistance, chemical resistance, non-sticking property and friction resistance.

The aqueous dispersion for fluorine-containing coating composition can be prepared through various methods. Examples of the method are, for instance, a method wherein a powder of the fluorine-containing polymer having functional group and prepared by suspension polymerization is finely pulverized and then the pulverized powder is dispersed homogeneously into an aqueous dispersion medium with a surfactant, a method wherein a fluorine-containing aqueous dispersion is prepared at the same time as emulsion polymerization and further a surfactant and additives are added as case demands, and the like methods. From the viewpoint of productivity and quality (for making particle size smaller and more uniform), a method of preparing an aqueous dispersion directly by emulsion polymerization is preferred.

A concentration of the polymer in the aqueous dispersion varies depending on intended coating thickness, concentration and viscosity of a coating composition, coating method, etc., and may be usually selected in the range of from about 5% by weight to about 70% by weight.

The coating method is not particularly limited. The coating may be carried out by brush coating, spray coating, roller coating or the like, followed by drying and then sintering at a temperature of not less than the melting point of the polymer and not more than its decomposition temperature depending on kind of the polymer.

The coating thickness may be selected depending on application, purpose, substrate, etc. For example, the coating thickness is from about 5 $\mu$m to about 200 $\mu$m, preferably from 10 to 100 $\mu$m.

The powder coating composition of the present invention comprises a powder of the above-mentioned fluorine-containing ethylenic polymer having functional group.

Further from the viewpoint of heat resistance, non-sticking property, corrosion resistance and chemical resistance, the reactive PFA or reactive FEP (II) is preferred, and from the viewpoint of stain-proofing property, processability and transparency, the reactive ETFE (III) is preferred.

As the fluorine-containing powder coating composition, there can be used preferably one in the form of powder or in the granular form having a particle size of 10 to 1,000 $\mu$m and an apparent density of 0.3 to 1.2 g/cc.

To the fluorine-containing powder coating composition can be added optionally additives in an amount not lowering remarkably characteristics such as heat resistance of the fluorine-containing resin. Examples of the additives are, for instance, pigments such as carbon powder, titanium oxide and cobalt oxide; reinforcing agents such as glass fiber powder, carbon fiber powder and mica; amine anti-oxidant; organic sulfur compound; organotin anti-oxidant; phenolic anti-oxidant; thermal stabilizer such as metal soap; leveling agent; anti-static agent; and the like.

The fluorine-containing powder coating composition and the additives may be admixed in the form of powder (dry method) or in the form of slurry (wet method), and the mixing in the form of powder is preferred. As the mixing equipment, there can be used a conventional mixer or pulverizer, for example, a sand mill, V blender, ribbon blender or the like.

The fluorine-containing powder coating composition is generally coated by electrostatic spray coating, fluid-bed dip coating, rotolining, etc., and then sintered at a temperature of not less than the melting point of the polymer and not more than its decomposition temperature depending on kind of the polymer, and thus a good coating film can be formed.

In general in case of electrostatic powder spray coating, a coating film having a thickness of 10 to 200 µm is formed, and in case of rotolining, a coating film having a thickness of 200 to 1,000 µm formed.

Further the fluorine-containing ethylenic polymer having functional group which is used for a fluorine-containing coating material can be also used, by utilizing its adhesive property, as a primer layer for a fluorine-containing coating composition which has good heat resistance at the time when applying a fluorine-containing resin having no functional group on surfaces of substrates such as metal and glass.

The primer for a fluorine-containing coating composition comprises the above-mentioned fluorine-containing ethylenic polymer having functional group.

As the primer, the same fluorine-containing polymer as mentioned above can be used. The primer is selected optionally depending on kind of a substrate surface, kind of the fluorine-containing polymer to be applied through the primer (kind of a top coat), etc. It is preferable in general that the primer for a fluorine-containing coating composition is one which has the same structure as the fluorine-containing polymer to be applied thereon and contains a functional group.

That combination of the primer and top coat assures good compatibility between the fluorine-containing polymer to be used as the primer and the fluorine-containing polymer to be applied thereon, and can give not only good adhesion to the substrate surface but also good intercoat adhesive strength between the primer layer and the top coat layer. Also even in case of the use at high temperature, unlike the case where the primer mixed with other resin component is used, intercoat adhesion failure to be caused due to a difference in thermal shrinkage between the polymers, cracking, pin hole, etc. are hard to arise. Further since the whole coating film comprises the fluorine-containing polymer, it can be used sufficiently for applications requiring transparency and vivid coloring. Still further excellent heat resistance, chemical resistance, non-sticking property and friction resistance can be exhibited more effectively even if a layer of fluorine-containing polymer having no functional group is formed on the outermost surface of the coating film.

Examples of the fluorine-containing polymer having no functional group and used for a top coat layer are PTFE, PFA, FEP, ETFE, PVdF and VdF copolymers.

As the primer for fluorine-containing coating composition, there can be used the above-mentioned fluorine-containing ethylenic polymer having functional group. In case where a substrate is coated with PTFE, it is preferable to use the primer selected from the reactive PTFE (I), reactive PFA and reactive FEP (II). It is particularly preferable to use, as the primer, thermo-melting reactive PFA or FEP (II) since it is possible to thermo-melt and strongly adhere to a substrate surface by sintering. In case where a substrate is coated with PFA or FEP, it is preferable to use, as the primer, reactive PFA or FEP (II). Further in case where a substrate is coated with ETFE, it is particularly preferable to use, as the primer, reactive ETFE (III) from the viewpoint of adhesion and transparency.

As a coating method using a primer layer, there can be used preferably a method of coating a fluorine-containing polymer, which mainly comprises the following three steps;

(First step) a step for applying, to a substrate surface, the primer for fluorine-containing coating composition comprising the above-mentioned fluorine-containing polymer having functional group, (Second step) a step for applying a fluorine-containing coating composition comprising a fluorine-containing polymer having no functional group, to the primer layer formed in the above first step, and (Third step) a step for sintering the laminated article obtained in the above first and second steps.

Further the primer layer applied in the above first step may be set by drying at 80° to 150° C. for about 5 minutes to about 30 minutes prior to the second step (2 coats/1 bake) or may be sintered, for example, at a high temperature of not less than the melting temperature thereof prior to the second step (2 coats/2 bakes).

The method for applying the primer in the first step is optionally selected depending on the form of the primer. For example, in case where the fluorine-containing primer is in the form of aqueous dispersion, spray coating, spin coating, brush coating and dip coating methods are used. Also in case of the form of powder coating composition, coating methods such as electrostatic coating, fluid-bed dip coating and rotolining are employed.

A thickness of the primer layer may vary depending on purpose, application, kind of a substrate surface and coating method. The thickness is from 1 to 50 µm, preferably from 2 to 20 µm. Since the thickness of the primer is in general thin as mentioned above, it is preferable to coat the primer in the form of aqueous dispersion by spray coating, etc.

The method for applying the coating composition comprising a fluorine-containing polymer having no functional group to the primer layer in the second step is optionally selected depending on kind of the fluorine-containing polymer, form of the coating, purpose and application. For example, in case of an aqueous dispersion and organic solvent dispersion, usually spray coating, brush coating, roller coating and spin coating are carried out. In case of a powder coating composition, electrostatic coating, fluid-bed dip coating and rotolining are carried out.

A coating thickness of the fluorine-containing polymer in this step varies entirely depending on purpose and application and coating method. The thickness is in general from 5 to 50 µm, preferably from about 10 µm to about 50 µm in case of spray coating. When a thin coating film is desired by using a powder coating composition, it is possible to apply at a thickness of 5 to 100 µm in case of electrostatic coating.

Sintering conditions in the third step are optionally selected depending on kinds of fluorine-containing polymers (component, melting point, etc.) of the primer layer and the top layer thereon. The sintering is carried out in general at a temperature of not less than the melting point of the both fluorine-containing polymers. A sintering time varies depending on the sintering temperature, and is from five minutes to three hours, preferably from about 10 minutes to about 30 minutes. For example, when coating with PTFE, PFA and FEP, sintering is carried out at 320° to 400° C., preferably 350° to 400° C.

As a material for the rollers, a rubber material is used, and the reactive fluorine-containing rubber (IV) is also preferred. The reactive fluorine-containing rubber (IV) is a blended composition of a fluorine-containing rubber and additives generally used. Though the reactive fluorine-containing rubber (IV) can be used as a molded article in the form of sheet and tube, it is preferable to use the rubber (IV) as a rubber coating from the viewpoint of processability and forming into a thin film. Examples of use of the reactive fluorine-containing rubber as a coating are explained below.

A liquid carrier is selected from organic solvents such as lower ketones, lower esters and cyclic ether, water and a mixture of water and water soluble organic liquid. Examples of the water soluble organic liquid are alcohols. Among those liquid carriers, water and a mixture mainly comprising water are most preferable from a point of not lowering efficiency of coating work.

An inorganic fibrous substance to be contained as other component of the fluorine-containing rubber coating is used for enhancing recovering ability after compression. Represented examples thereof are a glass fiber, carbon fiber, asbestos fiber, potassium titanate fiber and the like. It is desirable that an average length of the inorganic fibrous substance is at least 1 µm, preferably from 1 to 100 µm.

An amine compound which is added to the fluorine-containing rubber coating if desired functions mainly as a vulcanizing agent for a fluorine-containing rubber and also improves mechanical properties together with a coupling agent. Represented examples of the amine compound are monoamines such as ethylamine, propylamine, butylamine, benzylamine, allylamine, n-amylamine and ethanolamine; lo diamines such as ethylenediamine, trimethylenediamine, tetramethylenediamine, hexamethylenediamine and 3,9-bis(3-aminopropyl)-2,4,8,10-tetraoxaspiro[5,5]undecane; and polyamines such as diethylenetriamine, triethylenetetramine, tetraethylenepentamine and pentaethylenehexamine. Particularly preferred are amine compounds having not less than two terminal amino groups.

A uniform fluorine-containing rubber coating can be prepared usually by adding an electrically conductive substance, pigment, acid acceptor, filler, etc. to a mixture of a fluorine-containing rubber, fluorine-containing resin and liquid carrier (a surfactant may be used as case demands), adding, to the obtained dispersion, a coupling agent and if necessary, an amine compound (the above-mentioned pigment, acid acceptor, filler, etc. may be added as case demands) and then sufficiently mixing through usual method.

It is desirable that a proportion in weight of a fluorine-containing rubber to a fluorine-containing resin is 95:5 to 35:65. When the proportion of the fluorine-containing resin is lower than the above-mentioned lower limit, an intended improvement of non-sticking property and lubricity is not sufficiently made, and on the contrary, when more than the upper limit, a coating film having a desired thickness cannot be obtained and cracking and pin hole easily arise.

An adding amount of the coupling agent is usually from 1 to 50 parts by weight, preferably from 1 to 20 parts by weight based on 100 parts by weight of fluorine-containing rubber. When it is desired to add an amine compound, a total weight of the coupling agent and amine compound is within the above-mentioned range. In that case, a proportion of the coupling agent to the amine compound is selected in the range of from 1:99 to 99:1 in mole ratio.

As the acid acceptor, those which are usually used in vulcanization of fluorine-containing rubbers are similarly used. For example, one or a mixture of two or more of oxides or hydroxides of divalent metals are used. Examples thereof are oxides or hydroxides of magnesium, calcium, zinc, lead and the like. Also silica, clay, diatom earth, talc, carbon and the like are used as the filler.

The fluorine-containing rubber coating is applied or impregnated to a substrate by usual coating methods (brush coating, dip coating, spray coating, etc.) and cured under temperature condition of room temperature to 400° C., preferably from 100° to 400° C. for a proper period of time, thereby giving an intended fluorine-containing rubber coating film.

It is preferable that the thickness of fluorine-containing rubber coating film is not less than 5 µm. If the thickness is less than 5 µm, there is a fear that non-uniform coating arises over the whole surface of the substrate and non-coated portion occurs. The thus obtained fluorine-containing rubber coating film has heat resistance, weather resistance, abrasion resistance, oil resistance, solvent resistance and chemical resistance which a fluorine-containing rubber inherently possesses and in addition, electrical conductivity, and is excellent in adhesion to the substrate and mechanical properties. Further non-sticking property and lubricity are given to the film surface.

The coupling agent is a compound which acts on an interface between an organic element and an inorganic element and forms a strong bridge between the both elements through chemical and physical coupling. The coupling agent is usually a compound of silicon, titanium, zirconium, hafnium, thorium, tin, aluminum or magnesium and the compound has a group being capable of coupling of the organic element and inorganic element. Among those coupling agents, preferred are silane coupling agents, ortho-acid esters of transition elements in the group IV of Periodic Table (for example, titanium, zirconium, etc.) and derivatives thereof, and particularly preferred is an aminosilane compound.

Examples of the silane coupling agent are, for instance, silane compounds represented by the formula:

$$R^1 \cdot Si \cdot R^2_{3-a} \cdot R^3_a$$

wherein $R^1$ is a vinyl group or alkyl group having 1 to 10 carbon atoms and containing at least one functional atom or group selected from chlorine atom, amino group, aminoalkyl group, ureido group, glycidooxy group, epoxycyclohexyl group, acryloyloxy group, methacryloyloxy group, mercapto group and vinyl group, each of $R^2$ and $R^3$ is an atom or group selected from a chlorine atom, hydroxyl group, alkoxyl group having 1 to 10 carbon atoms, alkoxyl-substituted alkoxyl having 2 to 15 carbon atoms, hydroxyalkyloxy group having 2 to 4 carbon atoms and acyloxy group having 2 to 15 carbon atoms, a is 0, 1 or 2.

$R^1$ is an alkyl group having a functional substituent. Examples of the suitable alkyl group are a β-aminoethyl group, γ-aminopropyl group, N-(β-aminoethyl)-γ-aminopropyl group, γ-ureidopropyl group, γ-glycidoxypropyl group, β-(3,4-epoxycyclohexyl)ethyl group, γ-acryloyloxypropyl group, γ-methacryloyloxypropyl group, γ-mercaptopropyl group, β-chloroethyl group, β-chloropropyl group, γ-vinylpropyl group, and the like. Also $R^1$ may be a vinyl group.

Examples of the silane compound used suitably are, for instance, γ-aminopropyltriethoxysilane, N-β-aminoethyl-γ-aminopropyltrimethoxysilane, γ-ureidopropyltriethoxysilane, γ-glycidoxypropyltrimethoxysilane, β-(3,4-epoxycyclohexyl)ethyltrimethylsilane, γ-methacryloxypropyltrimethoxysilane, γ-mercaptopropyltrimethoxysilane, γ-chloropropyltrimethoxysilane, vinyltris(β-methoxyethoxy)silane, vinyltriethoxysilane, vinyltrichlorosilane, vinyltriacetoxysilane, N-(trimethoxysilylpropyl)ethylenediamine, N-β-aminoethyl-γ-aminopropylmethyldimethoxysilane, β-aminoethyl-β-aminoethyl-γ-aminopropyltrimethoxysilane, and the like. Among those silane coupling agents, particularly preferable are amino silane compounds, for example, γ-aminopropyltriethoxysilane, N-β-aminoethyl-γ-aminopropyltrimethoxysilane, N-(trimethoxysilylpropyl)ethylenediamine, N-β-aminoethyl-γ-aminopropylmethyldimethoxysilane, γ-ureidopropyltriethoxysilane and β-aminoethyl-β- aminoethyl-γ-aminopropyltrimethoxysilane since they not only functions as a vulcanizing agent for a fluorine-containing rubber but also contributes largely to enhancement of adhesion to a substrate and further is used safely against the liquid carrier.

Examples of the titanium, zirconium, hafnium and thorium compounds are, for instance, ortho-acid esters represented by the formula:

$$T(OR)_4$$

wherein T is titanium, zirconium, hafnium or thorium, R is an alkyl group, cycloalkyl group or aryl group, and derivatives thereof which are prepared by reacting one or more compounds having at least one functional group with the ortho-acid ester. Examples of the compound having at least one functional group are, for instance, polyols such as glycerin, ethylene glycol, 1,3-butanediol, 2,3-butanediol, hexylene glycol and octylene glycol, oxyaldehydes such as salicyl aldehyde and glycose, oxyketones such as diacetone alcohol and fructose, oxycarboxylic acids such as glycolic acid, lactic acid, dioxymaleic acid and citric acid, diketones such as diacetylacetone, ketonic acids such as acetoacetate, esters of ketonic acid such as ethyl acetoacetate, oxyamines such as triethanolamine and diethanolamine, oxyphenol compounds such as catechol and pyrogallol, and the like.

Examples of the compound when T is titanium are tetraalkyl titanates (for example, tetraethyl titanate, tetraisopropyl titanate and tetrabutyl titanate), tetraethylene glycol titanate, triethanolamine titanate, titanium acetylacetonate, isopropyltrioctanoyl titanate, isopropyltrimethacryl titanate, isopropyltriacryl titanate, isopropyltri(butyl, methylbilophosphate) titanate, tetraisopropyldi (dilaurylphosphite) titanate, dimethacryloxyacetate titanate, diacryloxyacetate titanate, di(dioctylphosphate)ethylene titanate, and the like.

As the zirconium compound, analogous compounds to the titanate compounds can be used. Example thereof are tetraalkyl zirconates such as tetraethyl zirconate and tetrabutyl zirconate, n-propyl zirconate, isopropyl zirconate, n-butyl zirconate, isobutyl zirconate, zirconium acetylacetonate, and the like.

As the hafnium and thorium compounds, there can be used analogous compounds to the titanium and zirconium compounds.

As the tin compounds, there can be used organic or inorganic compounds, for example, $SnCl_4$, and the like. Examples of the aluminum compound are aluminum isopropylate, monosec butoxyaluminum diisopropylate, aluminum sec-butylate, ethylacetoacetate aluminum diisopropylate, aluminum tris(ethylacetoacetate), and the like.

Examples of the magnesium compound are magnesium alcoholates such as magnesium methylate and magnesium ethylate.

The liquid carrier is added to expedite various coating works such as spray coating, brush coating and dip coating. Examples thereof are, for instance, lower ketones such as acetone, methyl ethyl ketone and cyclohexanone; lower esters such as ethyl acetate, propyl acetate and butyl acetate; cyclic ethers such as tetrahydrofuran and 1,4-dioxane; water; a mixture of water and an alcohol such as methanol, ethanol or isopropyl alcohol, glycol such as ethylene glycol or a water soluble organic liquid such as methyl cellosolve; and a mixture of two or more thereof. Particularly preferable are liquid carriers mainly comprising water from the viewpoint of workability in coating, storage stability and protection of environment.

In addition, as case demands, a surfactant, pigment, filler and other additives for a coating can be added.

Further additives which are usually used for various coatings depending on application may be added. Examples of such additives are, for instance, a pigment, adhesion enhancing agent (organic resin powder, etc.), lubricity imparting agent (fluorine-containing oil, etc.), abrasion resistance enhancing agent (inorganic ceramic powder, etc.), thickener, film forming agent, surfactant, and the like. An adding amount thereof may be optionally determined depending on application, coating method, etc. However attention must be paid not to lower non-sticking property directed by the present invention.

Then technique for applying the above-mentioned fluorine-containing ethylenic polymer having functional group in the form of film to produce non-sticking composite materials for OA equipment is explained.

Merits of applying in the form of film are as follows.

① A film comprising a fluorine-containing ethylenic polymer having functional group is advantageous from the viewpoint of processing since an applicator necessary for hot melt adhesive is not required, and the film can be adhered by thermocompression bonding while being put on a substrate or inserted between substrates.

② Further since a uniform adhesive layer is formed on the whole surface of substrate, a film free from nonuniform adhesion and having uniform adhesive strength can be obtained, and thus can be also applied to a substrate having poor compatibility or no compatibility therewith.

③ Further the film can be cut into various shapes, and thus is advantageous from the viewpoint of a small loss in processing work, good working environment and cost.

The preferred fluorine-containing polymer film of the present invention is one which is produced by molding the above-mentioned fluorine-containing ethylenic polymer having functional group. The film can be adhered to various substrates without surface treating and using usual adhesives, thereby giving excellent characteristics of a fluorine-containing polymer to a substrate.

Though it is possible to produce adhesive films from the above-mentioned fluorine-containing polymers having functional group by using various adhesives depending on application and purpose, film production process and adhering method, preferable is the above-mentioned copolymer (II) (reactive PFA or reactive FEP) or copolymer (III) (reactive ETFE) since the adhesive film itself has heat resistance, chemical resistance, mechanical properties and non-sticking property; efficient film molding represented by melt-molding can be carried out; the film has good moldability; making the film thin and uniform is possible; and it is possible to melt the film by various thermocompression bonding methods to adhere strongly and beautifully to various substrates. Particularly preferred functional group is hydroxyl from the viewpoint of heat resistance.

A thickness of the fluorine-containing polymer film is selected depending on purpose and application and is not limited particularly. The thickness is from 10 to 3,000 μm, preferably from 20 to 500 μm, particularly preferably from 40 to 300 μm.

In case of too thin films, special production method is required; it is difficult to handle the film at the time of adhering, and wrinkling, breaking and poor appearance occur easily; and there is a case where adhesive strength, mechanical strength, chemical resistance and weather resistance become insufficient. Too thick film is disadvantageous from the viewpoint of cost and workability at the time of bonding to one unit.

In the present invention, the fluorine-containing polymer film may be used alone or can be used in the laminated film comprising the film (adhesive layer) of fluorine-containing ethylenic polymer having functional group and the film (surface layer) of fluorine-containing ethylenic polymer having no functional group.

Namely one surface of the film is a layer comprising a fluorine-containing ethylenic polymer having functional group and has adhesive property to a substrate, and another surface of the film is a layer comprising usual fluorine-containing polymer. By bringing the surface of the fluorine-containing ethylenic polymer having functional group into contact to the substrate and adhering it to the substrate by thermocompression bonding, etc., excellent characteristics of the fluorine-containing polymer such as non-sticking property, stain-proofing property, friction resistance, weather resistance and chemical resistance can be given to the substrate or composite material including the substrate for cooking apparatuses.

In the present invention, a thickness of the two-layered laminated film of fluorine-containing polymer is selected depending on purpose and application, and is not limited particularly. The total thickness of two layers is from 20 to 5,000 $\mu$m, preferably from 40 to 1,000 $\mu$m, particularly preferably from 100 to 500 $\mu$m.

A thickness of each layer which can be used is from 5 to 1,000 $\mu$m, preferably from 10 to 500 $\mu$m, particularly preferably from 10 to 200 $\mu$m of the adhesive layer, and from about 15 $\mu$m to about 4,995 $\mu$m, preferably from 30 to 990 $\mu$m, particularly preferably from 90 to 490 $\mu$m of the fluorine-containing polymer layer (surface layer).

The film for the surface layer may be adhered after adhering the film for the adhesive layer to a substrate.

To the film of fluorine-containing polymer having functional group can be optionally incorporated proper additives such as a reinforcing agent, filler, stabilizer, ultraviolet ray absorber, pigment, etc. in an amount not lowering characteristics of the film. Those additives make it possible to improve thermal stability, surface hardness, abrasion resistance, weather resistance and electrostatic charge, etc.

The fluorine-containing film of the present invention can be produced, depending on kind of polymers used and desired shape of the film, by various methods such as thermal melting method, extrusion method, cutting method and solvent-casting method and a method of applying a powder or an aqueous dispersion or organic solvent dispersion to form a continuous coating film.

For example, a polymer which comprises the above-mentioned reactive PTFE and is difficult to be melt-molded can be molded by compression molding, extrusion molding (ram extrusion, paste extrusion, roller press, etc.) or the like. A polymer such as reactive PFA, FEP or ETFE which is melt-moldable is molded by compression molding and extrusion molding, and melt-extrusion molding is particularly preferred from the viewpoint of productivity and product quality.

Namely one surface of the film is a layer comprising a fluorine-containing ethylenic polymer having functional group and has adhesive property to a substrate, and another surface of the film is a layer comprising usual fluorine-containing polymer. By bringing the surface of the fluorine-containing ethylenic polymer having functional group into contact to the substrate and adhering it to the substrate by thermocompression bonding, etc., excellent characteristics of the fluorine-containing polymer such as chemical resistance, weather resistance, stain-proofing property, non-sticking property, friction resistance and electrical properties (high frequency electrical insulation) can be given to the substrate or composite material including the substrate.

In the present invention, a thickness of the two-layered laminated film of fluorine-containing polymer is selected depending on purpose and application, and is not limited particularly. The total thickness of two layers is from 20 to 5,000 $\mu$m, preferably from 40 to 1,000 $\mu$m, particularly preferably from 100 to 500 $\mu$m.

A thickness of each layer which can be used is from 5 to 1,000 $\mu$m, preferably from 10 to 500 $\mu$m, particularly preferably from 10 to 200 $\mu$m of the adhesive layer, and from about 15 $\mu$m to about 4,995 $\mu$m, preferably from 30 to 990 $\mu$m, particularly preferably from 90 to 490 $\mu$m of the fluorine-containing polymer layer (surface layer).

The film for the surface layer may be adhered after adhering the film for the adhesive layer to a substrate.

To the film of fluorine-containing polymer having functional group can be optionally incorporated proper additives such as a reinforcing agent, filler, stabilizer, ultraviolet ray absorber, pigment, etc. in an amount not lowering characteristics of the film. Those additives make it possible to improve thermal stability, surface hardness, abrasion resistance, weather resistance and electrostatic charge, etc.

The fluorine-containing resin film of the present invention can be produced, depending on kind of polymers used and desired shape of the film, by various methods such as thermal melting method, extrusion method, cutting method and solvent-casting method and a method of applying a powder or an aqueous dispersion or organic solvent dispersion to form a continuous coating film.

For example, a polymer which comprises the above-mentioned reactive PTFE and is difficult to be melt-molded can be molded by compression molding, extrusion molding (ram extrusion, paste extrusion, roller press, etc.) or the like. A polymer such as reactive PFA, FEP or ETFE which is melt-moldable is molded by compression molding and extrusion molding, and melt-extrusion molding is particularly preferred from the viewpoint of productivity and product quality.

Bonding of the two films into one laminated film can be carried out by a method of overlapping the respective molded films for adhesive layer and surface layer and then compression-molding; a method of applying one fluorine-containing polymer to a molded film comprising another fluorine-containing polymer; a method of carrying out film molding and bonding of films at the same time through multi-layer co-extrusion molding method, or the like method. Among them, the multi-layer co-extrusion molding method is preferred from the viewpoint of productivity and product quality.

When forming the fluorine-containing ethylenic polymer having functional group into a rubber sheet material, the above-mentioned reactive fluorine-containing rubber to which a vulcanizing agent is added is extruded or pressed, and thus a rubber sheet material can be obtained. The obtained sheet-like material may be stuck to a substrate and adhered together by vulcanization through conventional method.

For application of a tube-like material to a substrate, there are a method of winding the film-like material or sheet-like material onto a substrate in the form of roll and then adhering, preferably a method of melt-extruding the fluorine-containing ethylenic polymer having functional group to give a tube and then applying it as it is to the outside of the substrate in the form of roll. Further by a method of swelling an extruded tube to a desired outer diameter by compressed air application to the substrate is easier.

Adhesion of the film or sheet of fluorine-containing polymer having functional group to a substrate is achieved through thermal activation by heating, etc. Further thermo-melting adhesion is preferable. Represented examples of the adhering method are heating roller method and heat press method. Also there are other methods such as high-frequency heating, microwave heating, vacuum compression (vacuum press, etc.) and pneumatic press. Those methods can be optionally selected depending on kind and shape of a substrate, condition and kind of film, etc. Also adhesion of the tube to the substrate in the form of roll can be generally carried out, for example, through thermal activation by heating, etc.

Examples of the substrate on which the fluorine-containing ethylenic polymer having functional group can be adhered, are a metallic substrate, ceramic substrate, synthetic resin substrate, and the like.

Metals of the metallic substrate encompass metal, alloys of two or more metals, metal oxide, metal hydroxide, metal salts such as carbonate and sulfate, etc. Among them, metal, metal oxide and alloys are more preferable from the viewpoint of adhesive property.

Examples of the metallic substrate are metals and metal compounds of aluminum, iron, nickel, titanium, molybdenum, magnesium, manganese, copper, silver, lead, tin, chromium, beryllium, tungsten and cobalt, alloys of two or more thereof, etc.

Examples of the alloys are alloy steels such as carbon steel, Ni steel, Cr steel, Ni—Cr steel, Cr—Mo steel, stainless steel, silicon steel and permalloy; aluminum alloys such as Al—Cl, Al—Mg, Al—Si, Al—Cu—Ni—Mg and Al—Si—Cu—Ni—Mg; copper alloys such as brass, bronze, silicon bronze, silicon brass, nickel silver and nickel bronze; nickel alloys such as nickel manganese (D nickel), nickel-aluminum (Z nickel), nickel-silicon, Monel metal, Constantan, nichrome Inconel and Hastelloy; and the like.

Further as the aluminum-based metal, there can be used pure aluminum; aluminum oxide; and aluminum alloys for casting and expanding such as Al—Cu, Al—Si, Al—Mg, Al—Cu—Ni—Mg, Al—Si—Cu—Ni—Mg alloys, high tensile aluminum alloy and corrosion resistant aluminum alloy.

Also as the iron-based metals, there can be used pure iron, iron oxide, carbon steel, Ni steel, Cr steel, Ni—Cr steel, Cr—Mo steel, Ni—Cr—Mo steel, stainless steel, silicon steel, permalloy, non-magnetic steel, magnet steel, cast iron, etc.

Also the fluorine-containing ethylenic polymer having functional group can be adhered to a substrate which was subjected to, for the purpose of preventing corrosion of metal, coating of other metal by electroplating, hot dipping, chromatizing, siliconizing, colorizing, sheradizing, metal spraying, etc.; forming a phosphate film by phosphatization; forming metal oxide by anodizing or heat-oxidizing; or electrochemical corrosion prevention.

Further for the purpose of enhancing adhesion, the surface of metallic substrate may be subjected to chemical preparation with a phosphoric acid, sulfuric acid, chromic acid, oxalic acid, etc., or may be subjected to surface roughening by sand blasting, shot blasting, grit blasting, honing, paper scratching, wire scratching, hair line finishing, etc. For the purpose of exhibiting clear surface pattern of the substrate, the metal surface may be subjected to coloring, printing, etching, etc.

In case of the above-mentioned aluminum or aluminum alloy substrate, in order to enhance corrosion resistance, surface hardness and adhesive property of the substrate, it is possible to form an oxide film (alumite) on the substrate by anodizing with caustic soda, oxalic acid, sulfuric acid or chromic acid and also use the aluminum or aluminum alloy substrate subjected to other surface treatments mentioned above.

Further there may be used a substrate plated, on its surface, with other metal as mentioned above, for example, steel plate subjected to hot-dip zinc-plating, hot-dip zinc alloy plating, aluminum plating, zinc-nickel plating, zinc-aluminum plating, or the like; a substrate coated with other metal by diffusion coating or thermal spraying; a substrate, on which an oxide film is formed by chemical conversion treatment with chromic acid or phosphoric acid or heat-treatment; a substrate subjected to electric corrosion preventing treatment (for example, galvanized steel plate); or the like.

Examples of the ceramic substrate are, for instance, glass, pottery, porcelain, etc.

Components of glass are not particularly limited. Examples are silica glass, lead glass, non-alkali glass, alkali glass, etc.

Examples of the synthetic resin substrate are, for instance, an acrylic resin, polycarbonate, polyphenylene sulfide, polyamide, polyoxymethylene (POM), polyether ether ketone (PEEK), heat resistant engineering plastic, thermosetting resin such as polyimide, silicon or urethane rubber materials, etc.

Among the above-mentioned substrates, with respect to the metallic substrate suitable for the non-sticking composite materials for OA equipment of the present invention, an aluminum-based metal is mainly used for rollers, and other metals than aluminum, for example, SUS and steel sheets are used for other parts than rollers.

For the portions requiring transparency, a ceramic substrate of glass and a resin substrate of acrylic resin, polycarbonate, etc. are usually used.

Since there is a case where processing of OA equipment and its parts is difficult depending on kind thereof, it is preferable that a substrate therefor is in the form of finished product.

The composite materials of the present invention can be used for various OA equipment firstly because the fluorine-containing ethylenic polymer having functional group is applied to a substrate with good adhesion and secondly because the fluorine-containing ethylenic polymer having functional group has good non-sticking property, heat resistance, stain-proofing property and abrasion resistance.

OA equipment and its parts on which the non-sticking composite materials of the present invention can be used suitably are raised below. The present invention also relates to such OA equipment and its parts.

Those OA equipment and parts thereof are classified and shown in Tables 1 and 2.

The non-sticking composite materials for OA equipment of the present invention can be used, for example, on the following parts. Also mentioned below are a material of the substrate, kind and form of application of the fluorine-containing polymer having functional group and merits of use.

① Fuser Roller
(i) For Monochromatic Printing
  Substrate: Aluminum- or SUS-made substrate
  Fluorine-containing polymer having functional group: Reactive PFA or FEP
  Form of polymer to be applied: Coating or tube
  When this composite material is used, a fuser roller having excellent non-sticking property against a toner, durability and heat resistance can be obtained. Since the fluorine-containing polymer having functional group itself has excellent adhesive property, no primer need be provided, and processability in production is excellent.

(ii) For Both Monochromatic Printing and Color Printing

Substrate: Metallic substrate coated with silicon rubber or urethane rubber

Fluorine-containing polymer having functional group: Reactive PFA or FEP or reactive fluorine-containing rubber Form of polymer to be applied: Coating, tube or sheet When this composite material is used and if necessary, a silicon oil for separation is coated, a fuser roller having excellent non-sticking property against a toner, elasticity and abrasion resistance and assuring easy separation of paper can be obtained. Since the fluorine-containing polymer having functional group itself has excellent adhesive property, no primer need be provided, and processability in production is excellent.

② Pressure Roller (For Both Color and Monochromatic Printing)

Substrate: Metallic substrate coated with silicon rubber or urethane rubber

Fluorine-containing polymer having functional group: Reactive PFA or FEP or reactive fluorine-containing rubber Form of polymer to be applied: Coating, tube or molding When this composite material is used, a pressure roller having excellent non-sticking property against a toner, elasticity and abrasion resistance can be obtained. Since the fluorine-containing polymer having functional group itself has excellent adhesive property, no primer need be provided, and processability in production is excellent.

③ Charging Roller (For Both Color and Monochromatic Printing)

Substrate: Urethane rubber-made substrate

Fluorine-containing polymer having functional group: Reactive fluorine-containing rubber Form of polymer to be applied: Coating When this composite material is used, a charging roller having excellent controllability of electric conductivity, uniformity of resistance, abrasion resistance and non-sticking property against a toner and assuring easy separation of paper can be obtained. Since the fluorine-containing polymer having functional group itself has excellent adhesive property, no primer need be provided, and processability in production is excellent.

④ Transfer Roller (For Both Color and Monochromatic Printing)

Substrate: Urethane rubber-made substrate

Fluorine-containing polymer having functional group: Reactive fluorine-containing rubber Form of polymer to be applied: Coating When this composite material is used, a transfer roller having excellent controllability of electric conductivity, uniformity of resistance, abrasion resistance and elasticity and assuring easy separation of paper can be obtained. Since the fluorine-containing polymer having functional group itself has excellent adhesive property, no primer need be provided, and processability in production is excellent.

⑤ Transfer Belt (For Both Color and Monochromatic Printing)

Substrate: Polyimide-made substrate

Fluorine-containing polymer having functional group: Reactive PFA or FEP or reactive fluorine-containing rubber Form of polymer to be applied: Film or coating When this composite material is used, a transfer belt having excellent controllability of electric conductivity, uniformity of resistance, abrasion resistance and non-sticking property against a toner can be obtained. Since the fluorine-containing polymer having functional group itself has excellent adhesive property, no primer need be provided, and processability in production is excellent.

⑥ Separating Claw and Fixing Bearing (Surface)

Substrate: Heat resistant resin-made substrate (for example, polyphenylene sulfide, polyamide imide, polyether imide, POM, PEEK or the like)

Fluorine-containing polymer having functional group: Reactive PTFE or reactive PFA or FEP Form of polymer to be applied: Coating When this composite material is used, a separating claw having excellent non-sticking property against a toner and abrasion resistance, assuring easy paper feeding and hardly injuring a roller and a fixing bearing having excellent friction property, abrasion resistance and heat resistance can be obtained. Since the fluorine-containing polymer having functional group itself has excellent adhesive property, no primer need be provided, and processability in production is excellent.

⑦ Paper Delivery Roller and Paper Delivery Guide

Substrate: Resin-made substrate (for example, polyphenylene sulfide, polyamide imide, polyether imide, POM, PEEK, or the like)

Fluorine-containing polymer having functional group: Reactive PTFE or reactive PFA or FEP Form of polymer to be applied: Coating When this composite material is used, a paper delivery roller and paper delivery guide having excellent non-sticking property against toner and abrasion resistance can be obtained. Since the fluorine-containing polymer having functional group itself has excellent adhesive property, no primer need be provided, and processability in production is excellent.

Also the composite materials of the present invention can be used on the following parts for OA equipment particularly by making the use of its good transparency.

⑧ Cathode Ray Tube, Liquid Crystal Panel and Plasma Display (Front Surface)

Substrate: Glass

Fluorine-containing polymer having functional group: Reactive PFA or FEP or reactive ETFE Form of polymer to be applied: Film or coating When this composite material is used, a cathode ray tube, liquid crystal panel and plasma display having excellent transparency and stain-proofing property against dust, fingerprint, etc. and excellent property for preventing scattering when broken by an impact or dropping during carrying can be obtained. No primer need be provided, and processability in production is excellent.

⑨ Contact Glass (Surface)

Substrate: Glass

Fluorine-containing polymer having functional group: Reactive PFA or FEP or reactive ETFE Form of polymer to be applied: Coating When this composite material is used, a contact glass having excellent transparency, stain-proofing property against fingerprint, etc. and non-sticking property against ink eraser, marking ink, etc. can be obtained. Since the fluorine-containing polymer having functional group itself has excellent adhesive property, no primer need be provided, and processability in production is excellent.

TABLE 1

| Parts | Specifications | Treatment on substrate of existing parts | Prior art | Characteristics desired |
|---|---|---|---|---|
| Fuser roller | For monochromatic printing | PFA in the application of ① tube, ② powder coating and ③ enamel | Poor processability due to insufficient adhesion | Non-sticking property against a toner, durability, heat resistance |
| | For both color and monochromatic printing | Application of ① silicon rubber + fluorine-containing rubber + silicon rubber + silicon oil and ② silicon rubber + fluorine-containing rubber + fluorine-containing silicon oil | Poor processability due to insufficient adhesion and poor abrasion resistance | Non-sticking property against a toner, easy separation of a paper, elasticity, abrasion resistance |
| Pressure roller | For both color and monochromatic printing | ① Silicon rubber only, ② PFA tube on ① and ③ fluorine-containing rubber coating on ① | Poor processability due to insufficient adhesion | Non-sticking property against a toner, elasticity, abrasion resistance |
| Charging roller | For both color and monochromatic printing | ① Chloroprene rubber + nylon tube, ② hydrin rubber + nylon tube and ③ urethane rubber | Poor processability due to insufficient adhesion, poor abrasion resistance, not good feeding of paper (increase in speed is difficult), poor non-sticking property against a toner | Conductivity and its controllability, uniformity of resistance, easy separation of a paper (feeding of paper), abrasion resistance (rubbing of paper), non-sticking property against a toner |
| Transfer roller | For both color and monochromatic printing | Urethane or silicon rubber | Poor processability due to insufficient adhesion, poor abrasion resistance, not good feeding of paper (increase in speed is difficult) | Conductivity and its controllability, uniformity of resistance, abrasion resistance (rubbing of paper), elasticity |
| OA belt (transfer belt) | For both color and monochromatic printing | Not treated (polyimide film) | | Conductivity and its controllability, uniformity of resistance, abrasion resistance (rubbing of paper), non-sticking property against a toner |
| Cathode ray tube | Front surface | Not treated (glass) | | Stain-proofing property (against dust and fingerprint), prevention of scattering |
| Liquid crystal panel | Front surface | Not treated (glass) | | Stain-proofing property (against dust and fingerprint), prevention of scattering |
| Plasma display | Front surface | Not treated (glass) | | Stain-proofing property (against dust and fingerprint), prevention of scattering |
| Contact glass | Front surface | Not treated (glass) | | Stain-proofing property (fingerprint), non-sticking property (ink eraser, marking ink, etc.) |

TABLE 2

| Parts | Specifications | Substrate | Preferred polymer* | Application | Effect of reactive fluorine-containing polymer | OA equipment to which parts are applicable |
|---|---|---|---|---|---|---|
| Fuser roller | For monochromatic printing | Metal such as aluminum and SUS | II | Powder coating, enamel, tube | Enhancement of processability since no primer is used, increase in heat resistance of adhesion | Facsimile machine |
| | For both color and monochromatic printing | Metal coated with silicon rubber or urethane rubber and further silicon oil for separation | II, IV | Powder coating, enamel, tube, rubber coating, molding rubber | Enhancement of processability since no primer is used and increase in abrasion resistance because of enhanced adhesion | Copying machine (photosensitive, electrostatic and heat-sensitive type) |
| Pressure roller | For both color and | Metal coated with silicon | II, IV | PFA tube, rubber | Enhancement of processability since no primer is used and | printer for computer |

TABLE 2-continued

| Parts | Specifications | Substrate | Preferred polymer* | Application | Effect of reactive fluorine-containing polymer | OA equipment to which parts are applicable |
|---|---|---|---|---|---|---|
| | monochromatic printing | rubber or urethane rubber | | coating, molding rubber | increase in abrasion resistance because of enhanced adhesion | |
| Charging roller | For both color and monochromatic printing | Urethane rubber | IV | Rubber coating | Enhancement of processability since no primer is used and increase in abrasion resistance because of enhanced adhesion | Copying machine (for office use) |
| Transfer roller | For both color and monochromatic printing | Urethane rubber | IV | Rubber coating | Enhancement of processability since no primer is used and increase in abrasion resistance because of enhanced adhesion | Remote control electrostatic electrophotocopying and indicating machine with facsimile receiver, copying machine (electronic) |
| OA belt (transfer belt) | For both color and monochromatic printing | Polyimide film | II, IV | Lamination of film, coating | Enhancement of processability since no primer is used and increase in abrasion resistance because of enhanced adhesion | |
| Cathode ray tube | Front surface | Glass | II, III | Lamination of film, coating | Enhancement of processability since no primer is used, and maintenance of transparency | |
| Liquid crystal panel | Front surface | Glass | II, III | Lamination of film, coating | Enhancement of processability since no primer is used, and maintenance of transparency | |
| Plasma display | Front surface | Glass | II, III | Lamination of film, coating | Enhancement of processability since no primer is used, and maintenance of transparency | |
| Contact glass | Front surface | Glass | II, III | coating | Enhancement of processability since no primer is used, and maintenance of transparency | Copying machine (photosensitive, electrostatic and heat-sensitive type), copying machine (for office use), copying machine (electronic) |

The present invention is then explained by means of preparation examples and examples, but the present invention is not limited to those examples.

PREPARATION EXAMPLE 1
(Preparation of Aqueous Dispersion Comprising PFA Having Hydroxyl)

A 3-liter glass-lined autoclave equipped with a stirrer, valve, pressure gauge and thermometer was charged with 1,500 ml of pure water and 9.0 g of ammonium perfluorooctanoate. After replacing with nitrogen gas sufficiently, the autoclave was evacuated and charged with 20 ml of ethane gas.

Then 3.8 g of perfluoro-(1,1,9,9-tetrahydro-2,5-bistrifluoromethyl-3,6-dioxa-8-nonenol) (formula (7)):

(7)

and 18 g of perfluoro(propyl vinyl ether) (PPVE) were fed into the autoclave with pressurized nitrogen gas, and a temperature inside the system was maintained at 70° C.

Pressurized tetrafluoroethylene (TFE) gas was introduced into the autoclave with stirring so that the inside pressure of the autoclave became 8.5 kgf/cm$^2$G.

Then a solution prepared by dissolving 0.15 g of ammonium persulfate in 5.0 g of water was added with pressurized nitrogen gas to initiate the reaction.

Since the pressure lowered with the advance of the polymerization reaction, it was increased again to 8.5 kgf/cm$^2$G by feeding tetrafluoroethylene gas at the time when it lowered to 7.5 kgf/cm$^2$G. Thus the decreasing and increasing of the pressure were repeated.

With continuing supply of tetrafluoroethylene, every time when about 40 g of tetrafluoroethylene gas was consumed after starting of the polymerization, 1.9 g of the above-mentioned fluorine-containing ethylenic monomer having hydroxyl (compound represented by the formula (7)) was introduced under pressure three times (5.7 g in total) to continue the polymerization. At the time when about 160 g of tetrafluoroethylene gas was consumed after starting of the polymerization, the supplying thereof was terminated and the autoclave was cooled and the un-reacted monomer was released to give 1,702 g of a bluish semi-transparent aqueous dispersion.

A concentration of the polymer in the obtained aqueous dispersion was 10.9%, and a particle size measured by dynamic light scattering method was 70.7 nm.

Also a part of the obtained aqueous dispersion was sampled and subjected to freeze coagulation, and the precipitated polymer was rinsed and dried to isolate a white solid. Components and their amounts of the obtained copolymer which were determined through $^{19}$F-NMR and IR analyses were TFE/PPVE/(Fluorine-containing ethylenic monomer having hydroxyl and represented by the formula (7))=97.7/1.2/1.1% by mole.

In infrared spectrum, characteristic absorption of —OH was observed at 3,620 to 3,400 cm$^{-1}$.

According to DSC analysis, Tm was 310° C., and according to DTGA analysis, 1% thermal decomposition temperature Td was 368° C. A melt flow rate measured under conditions of preheating at 372° C. for five minutes at a load of 7 kgf/cm$^2$ by using Koka-type flow tester and nozzles of 2 mm diameter×8 mm length was 12.0 g/10 min.

PREPARATION EXAMPLE 2
(Preparation of Aqueous Dispersion Comprising PFA Having Hydroxyl)

The same autoclave as in Preparation Example 1 was charged with 1,500 ml of pure water and 9.0 g of ammonium perfluorooctanoate. After replacing with nitrogen gas sufficiently, the autoclave was evacuated and charged with 20 ml of ethane gas.

Then 1.9 g of perfluoro-(1,1,9,9-tetrahydro-2,5-bistrifluoromethyl-3,6-dioxa-8-nonenol) (compound of the formula (7)) and 16.1 g of perfluoro(propyl vinyl ether) (PPVE) were fed into the autoclave with pressurized nitrogen gas, and a temperature inside the system was maintained at 70° C.

Pressurized tetrafluoroethylene (TFE) gas was introduced into the autoclave with stirring so that the inside pressure became 8.5 kgf/cm$^2$G.

Then a solution prepared by dissolving 0.15 g of ammonium persulfate in 5.0 g of water was fed with pressurized nitrogen gas to initiate the reaction.

Since the pressure lowered with the advance of the polymerization reaction, at the time when the pressure lowered down to 7.5 kgf/cm$^2$G, it was increased again to 8.5 kgf/cm$^2$G with tetrafluoroethylene gas, and the decreasing and increasing of the pressure were repeated.

With continuing supply of tetrafluoroethylene, every time when 40 g of tetrafluoroethylene gas was consumed after starting of the polymerization, 0.95 g of the fluorine-containing ethylenic monomer having hydroxyl (compound represented by the formula (7)) was introduced three times (2.85 g in total) under pressure to continue the polymerization. When 160 g of tetrafluoroethylene was consumed after starting of the polymerization, the supplying thereof was terminated. The autoclave was cooled and the un-reacted monomer was released to give 1,692 g of an aqueous dispersion. A concentration of the polymer in the obtained aqueous dispersion was 10.6% and a particle size thereof was 76.8 nm.

A part of the aqueous dispersion was sampled, and a white solid was isolated in the same manner as in Preparation Example 1.

The same analysis as above of the obtained white solid indicates:

TFE/PPVE/(Fluorine-containing monomer having hydroxyl and represented by the formula (7))=98.3/1.1/0.6% by mole Tm=310° C.

1% Thermal decomposition temperature Td=374° C.

Melt flow rate: 9.5 g/10 min

In infrared spectrum, characteristic absorption of —OH was observed at 3,620 to 3,400 cm$^{-1}$.

PREPARATION EXAMPLE 3

(Synthesis of Aqueous Dispersion of PFA Having No Functional Group)

Emulsion polymerization was carried out in the same manner as in Preparation Example 1 except that perfluoro-(1,1,9,9-tetrahydro-2,5-bistrifluoromethyl-3,6-dioxa-8-nonenol) (compound of the formula (7)) was not used, and 1,662 g of an aqueous dispersion of PFA having no functional group was obtained.

A concentration of the polymer in the aqueous dispersion was 9.7%, and a particle size thereof was 115 nm.

A white solid was isolated and analyzed in the same manner as in Preparation Example 1.

TFE/PPVE=98.9/1.1% by mole

Tm=310° C.

1% Thermal decomposition temperature Td=479° C.

Melt flow rate: 19.2 g/10 min

In infrared spectrum, no characteristic absorption of —OH was observed.

PREPARATION EXAMPLE 4

(Synthesis of PFA Having Hydroxyl)

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 5.0 g of perfluoro-(1,1,9,9-tetrahydro-2,5-bistrifluoromethyl-3,6-dioxa-8-nonenol) (compound of the formula (7)), 130 g of perfluoro(propyl vinyl ether) (PPVE) and 180 g of methanol were fed into the autoclave with pressurized nitrogen gas, and a temperature inside the system was maintained at 35° C.

Pressurized tetrafluoroethylene (TFE) gas was introduced into the autoclave with stirring so that the inside pressure became 8.0 kgf/cm$^2$G. Then 0.5 g of a 50% methanol solution of di-n-propyl peroxydicarbonate was fed with pressurized nitrogen to initiate the reaction.

Since the pressure lowered with the advance of the polymerization reaction, at the time when the pressure lowered down to 7.5 kgf/cm$^2$G, it was increased again to 8.0 kgf/cm$^2$G by feeding tetrafluoroethylene gas, and the decreasing and increasing of the pressure were repeated.

With continuing supply of tetrafluoroethylene, every time when about 60 g of tetrafluoroethylene gas was consumed after starting of the polymerization, 2.5 g of the fluorine-containing ethylenic monomer having hydroxyl (compound represented by the formula (7)) was introduced nine times (22.5 g in total) under pressure to continue the polymerization. When about 600 g of tetrafluoroethylene was consumed after starting of the polymerization, the supplying thereof was terminated. The autoclave was cooled and the un-reacted monomer and R-114 were released.

The obtained copolymer was washed with water, rinsed with methanol and then vacuum-dried to give 710 g of a white solid. The composition of the obtained copolymer was TFE/PPVE/(Fluorine-containing ethylenic monomer having hydroxyl and represented by the formula (7))=97.0/2.0/1.0% by mole according to $^{19}$F-NMR and IR analyses. In infrared spectrum, characteristic absorption of —OH was observed at 3,620 to 3,400 cm$^{-1}$. According to DSC analysis, Tm was 305° C., and according to DTGA analysis, 1% thermal decomposition temperature Td was 375° C. A melt flow rate measured under conditions of preheating at 372° C. for five minutes at a load of 7 kgf/cm$^2$ by using Koka-type flow tester and nozzles of 2 mm diameter×8 mm length was 32 g/10 min.

PREPARATION EXAMPLE 5

(Synthesis of PFA Having Hydroxyl)

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then the reaction was initiated in the same manner as in Preparation Example 4 except that 2.5 g of perfluoro-(1,1,9,9-tetrahydro-2,5-bistrifluoromethyl-3,6-dioxa-8-nonenol) (formula (7)), 132 g of perfluoro(propyl vinyl ether) (PPVE) and 230 g of methanol were used. A temperature inside the system was maintained at 35° C.

Pressurized tetrafluoroethylene (TFE) gas was introduced into the autoclave with stirring so that the inside pressure of the autoclave became 8.0 kgf/cm$^2$G. Then 0.5 g of a 50% methanol solution of di-n-propyl peroxydicarbonate was added with pressurized nitrogen gas to initiate the reaction.

Since the pressure lowered with the advance of the polymerization reaction, it was increased again to 8.0 kgf/ cm²G by feeding tetrafluoroethylene gas at the time when it lowered to 7.5 kgf/cm2G. Thus the decreasing and increasing of the pressure were repeated.

Further 680 g of a white solid copolymer was obtained in the same manner as in Preparation Example 4 except that every time when about 60 g of tetrafluoroethylene gas was consumed after starting of the polymerization, 1.23 g of the above-mentioned fluorine-containing ethylenic monomer having hydroxyl (compound represented by the formula (7)) was introduced under pressure nine times (11.10 g in total). Components and their amounts of the obtained copolymer which were determined through $^{19}$F-NMR and IR analyses were TFE/PPVE/(Fluorine-containing ethylenic monomer having hydroxyl and represented by the formula (7))=97.6/2.0/0.4% by mole. In infrared spectrum, characteristic absorption of —OH was observed at 3,620 to 3,400 cm$^{-1}$. According to DSC analysis, Tm was 310° C., and according to DTGA analysis, a decomposition starting temperature was 368° C. and 1% thermal decomposition temperature Td was 375° C. A melt flow rate measured under conditions of preheating at 372° C. for five minutes at a load of 7 kgf/cm$^2$ by using Koka-type flow tester and nozzles of 2 mm diameter×8 mm length was 42 g/10 min.

PREPARATION EXAMPLE 6
(Synthesis of PFA Having No Functional Group)

Synthesis was carried out in the same manner as in Preparation Example 4 except that perfluoro-(1,1,9,9-tetrahydro-2,5-bistrifluoromethyl-3,6-dioxa-8-nonenol) (compound represented by the formula (7)) was not used and 240 g of methanol was used, and thus 597 g of PFA having no functional group was obtained.

The obtained PFA was analyzed in the same manner as in Preparation Example 4 and the results were as follows.
TFE/PPVE=98.2/1.8% by mole
Tm=310° C.
Td=469° C. (1% weight reduction)
Melt flow rate: 24 g/10 min

PREPARATION EXAMPLE 7
(Preparation of PFA Powder Coating Composition Having Hydroxyl)

The PFA powder having hydroxyl (apparent specific gravity: 0.5, true specific gravity: 2.1, average particle size: 600 µm) and prepared in Preparation Example 4 was compressed into a sheet of 60 mm wide×5 mm thick by a Roller Compactor (Model BCS-25 available from Shinto Kogyo Kabushiki Kaisha), and then crushed into about 10 mm diameter by a crusher and further finely pulverized at room temperature at 11,000 rpm by a pulverizer (Cosmomizer Model N-1 available from Kabushiki Kaisha Nara Kikai Seisakusho). Subsequently the coarse powder particles of not less than 170 mesh (88 µm of sieve opening) were separated by a classifier (Hibolder Model 300SD available from Shi-Tokyo Kikai Kabushiki Kaisha) to give a PFA powder coating composition having hydroxyl. An apparent density of the powder was 0.7 g/ml, and an average particle size thereof was 20 µm.

PREPARATION EXAMPLE 8
(Preparation of PFA Powder Coating Composition Having No Functional Group)

A PFA powder coating composition was prepared in the same manner as in Preparation Example 7 except that the PFA powder having no functional group (apparent specific gravity: 0.6, true specific gravity: 2.1, average particle size: 400 µm) and prepared in Preparation Example 6 was used instead of the PFA powder having hydroxyl and prepared in Preparation Example 4. An apparent density of the powder was 0.73 g/ml, and an average particle size thereof was 20 µm.

PREPARATION EXAMPLE 9
(Synthesis of Fluorine-containing Polymer Prepared by Using a Non-fluorine-containing Monomer Having Functional Group)

A 1-liter stainless steel autoclave equipped with a stirrer, valve, pressure gauge and thermometer was charged with 250 g of butyl acetate, 36.4 g of vinyl pivalate (VPi) and as a non-fluorine-containing monomer having hydroxyl, 32.5 g of 4-hydroxybutyl vinyl ether (HBVE) and 4.0 g of isopropoxycarbonyl peroxide. After cooling to 0° C. with ice and replacing with nitrogen gas sufficiently, the autoclave was evacuated and charged with 47.5 g of isobutylene (IB) and 142 g of tetrafluoroethylene (TFE).

The autoclave was heated to 40° C. and reaction was carried out for 30 hours with stirring. At the time when the inside pressure of the reaction vessel was lowered to not more than 2.0 kg/cm$^2$, the reaction was terminated. The autoclave was cooled and un-reacted gas monomer was released, and thus a butyl acetate solution of a fluorine-containing polymer was obtained. A polymer concentration was 45%.

A fluorine-containing polymer was separated from the obtained butyl acetate solution of a fluorine-containing polymer through re-precipitation method, followed by sufficiently reducing pressure and drying, thus being separated in the form of white solid. According to $^1$H-NMR and $^{19}$F-NMR elementary analyses, the obtained fluorine-containing polymer was a copolymer of TFE/IB/VPi/HBVE=44/34/15/7% by mole.

PREPARATION EXAMPLE 10
(Production of Film of PFA Having Hydroxyl)

A metal die of 100 mm diameter was charged with 8.0 g of the white solid obtained in Preparation Example 4 and set on a press machine of 350° C., followed by preheating for 30 minutes and then compression-molding at 70 kg/cm$^2$ for one minute. Thus a 0.5 mm thick film was obtained.

PREPARATION EXAMPLE 11
(Production of Film of PFA Having Hydroxyl)

The same procedures as in Preparation Example 10 were repeated except that the white solid obtained in Preparation Example 5 was used, to give a 0.5 mm thick film.

PREPARATION EXAMPLE 12
(Production of Film of PFA Having No Functional Group)

The same procedures as in Preparation Example 10 were repeated except that the white solid obtained in Preparation Example 6 was used, to give a 0.5 mm thick film.

PREPARATION EXAMPLE 13
(Production of Film of PFA Having Hydroxyl by Extrusion)

The white solid obtained in Preparation Example 4 was extruded at 350° to 370° C. by using a two screw extruder (LABOPLASTOMIL available from Toyo Seiki Kabushiki Kaisha) to give pellets. The pellets were extruded at 360° to 380° C. at a roller temperature of 120° C. by using a single screw extruder (LABOPLASTOMIL available from Toyo Seiki Kabushiki Kaisha) to give a film of 10 cm wide×100 to 150 µm thick.

PREPARATION EXAMPLE 14
(Production of film of PFA Having no Functional Group by Extrusion)

The same procedures as in Preparation Example 13 were repeated except that the white solid obtained in Preparation Example 6 was used, to give pellets. Further extrusion was carried out in the same manner as in Preparation Example 13 to give a film of 10 cm wide×100 to 150 μm thick.

PREPARATION EXAMPLE 15
(Production of Laminated Film of PFA Having Hydroxyl and PTFE)

The film of PFA having hydroxyl and obtained in Preparation Example 13 and a 0.5 mm thick PTFE film were overlapped and compression-molded in the same manner as in Preparation Example 10.

The two layers were adhered strongly.

EXAMPLE 1

(1) Pre-treatment of Substrate
A 1.5 mm thick pure aluminum plate (A1050P) and a 1.5 mm thick SUS304 plate were degreased respectively with acetone.

(2) Formation of Primer Layer Comprising Fluorine-containing Polymer Having Functional Group
An aqueous dispersion comprising PFA having hydroxyl and prepared in Preparation Example 1 was applied to the plate by an air spray so that a coating thickness would become about 5 μm, followed by infrared-drying at 90° C. for 10 minutes and sintering at 380° C. for 20 minutes.

(3) Formation of Layer (Top Layer) Comprising Fluorine-containing Polymer Having No Functional Group
Onto the primer layer obtained in (2) above was applied an aqueous coating composition of PTFE (POLYFLON TFE Enamel EK4300CRN available from DAIKIN INDUSTRIES, LTD.) as a coating composition of fluorine-containing polymer having no functional group by an air spray so that a coating thickness would become about 20 μm, followed by infrared-drying at 90° C. for 10 minutes and sintering at 380° C. for 20 minutes.

(4) Evaluation of Adhesive Property
The method of evaluation is as follows.
(Cross-cut Adhesion Test)
According to JIS K 5400 1990, 8. 5. 2, a coated surface was cross-cut to give 100 squares, and an adhesive tape (available from Nichiban Kabushiki Kaisha) is adhered to the cross-cut surface sufficiently. Then immediately the tape is torn off. This is repeated 10 times with new adhesive tapes to check to see how many squares remain among 100 squares. The results are shown in Table 3.

EXAMPLE 2

A coated plate was produced in the same manner as in Example 1 except that a primer layer was formed by using the aqueous dispersion comprising PFA having hydroxyl and obtained in Preparation Example 2 as a primer comprising a fluorine-containing polymer having functional group. The evaluation for adhesive property was carried out, and the results are shown in Table 3.

COMPARATIVE EXAMPLE 1

A coated plate was produced in the same manner as in Example 1 except that a primer layer was formed by using the aqueous dispersion comprising PFA having no functional group and obtained in Preparation Example 3 instead of a primer comprising a fluorine-containing polymer having functional group. The evaluation for adhesive property was carried out, and the results are shown in Table 3.

EXAMPLES 3 to 4 and COMPARATIVE EXAMPLE 2

Coated plates were produced in the same manner as in Example 1 in case of Example 3, in Example 2 in case of Example 4 and in Comparative Example 1 in case of Comparative Example 2 except that a top layer was formed by using an aqueous coating composition comprising FEP (NEOFLON FEP Dispersion ND-1 available from DAIKIN INDUSTRIES, LTD) as a coating composition comprising a fluorine-containing polymer having no functional group. The evaluation for adhesive property was carried out, and the results are shown in Table 3.

EXAMPLE 5

(1) Pre-treatment of Substrate
Pre-treatment was carried out in the same manner as in Example 1.

(2) Formation of Primer Layer Comprising Fluorine-containing Polymer Having Functional Group
An aqueous dispersion comprising PFA having hydroxyl and prepared in Preparation Example 1 was applied to the plate by an air spray so that a coating thickness would become about 5 μm, followed by infrared-drying at 90° C. for 10 minutes.

(3) Formation of Layer (Top Layer) Comprising Fluorine-containing Polymer Having No Functional Group
Onto the primer layer obtained in (2) above was applied a powder coating composition of PFA (NEOFLON PFA Powder Coating Composition ACX-31 available from DAIKIN INDUSTRIES, LTD.) as a coating composition of fluorine-containing polymer having no functional group by electrostatic coating so that a coating thickness would become 40 μm, followed by sintering at 380° C. for 20 minutes.

(4) Evaluation of Adhesive Property
The evaluation was carried out in the same manner as in Example 1, and the results are shown in Table 3.

EXAMPLE 6

A coated plate was produced in the same manner as in Example 5 except that a primer layer was formed by using the aqueous dispersion comprising PFA having hydroxyl and obtained in Preparation Example 2 as a primer comprising a fluorine-containing polymer having functional group. The evaluation for adhesive property was carried out, and the results are shown in Table 3.

COMPARATIVE EXAMPLE 3

A coated plate was produced in the same manner as in Example 5 except that a primer layer was formed by using the aqueous dispersion comprising PFA having no functional group and obtained in Preparation Example 3 instead of a primer comprising a fluorine-containing polymer having functional group. The evaluation for adhesive property was carried out, and the results are shown in Table 3.

TABLE 3

|  | Ex. 1 | Ex. 2 | Com. Ex. 1 | Ex. 3 | Ex. 4 | Com. Ex. 2 | Ex. 5 | Ex. 6 | Com. Ex. 3 |
|---|---|---|---|---|---|---|---|---|---|
| Fluorine-containing aqueous dispersion used for primer layer | Prep. Ex. 1 | Prep. Ex. 2 | Prep. Ex. 3 | Prep. Ex. 1 | Prep. Ex. 2 | Prep. Ex. 3 | Prep. Ex. 1 | Prep. Ex. 2 | Prep. Ex. 3 |
| Fluorine-containing resin forming top layer | PTFE | PTFE | PTFE | FEP | FEP | FEP | PFA | PFA | PFA |
| Evaluation of adhesion (Cross-cut adhesion test) | | | | | | | | | |
| SUS304 | 100/100 | 100/100 | 0/100 | 100/100 | 100/100 | 0/100 | 100/100 | 100/100 | 20/100 |
| Pure aluminum | 100/100 | 100/100 | 0/100 | 100/100 | 100/100 | 20/100 | 100/100 | 100/100 | 30/100 |

Figure 2:
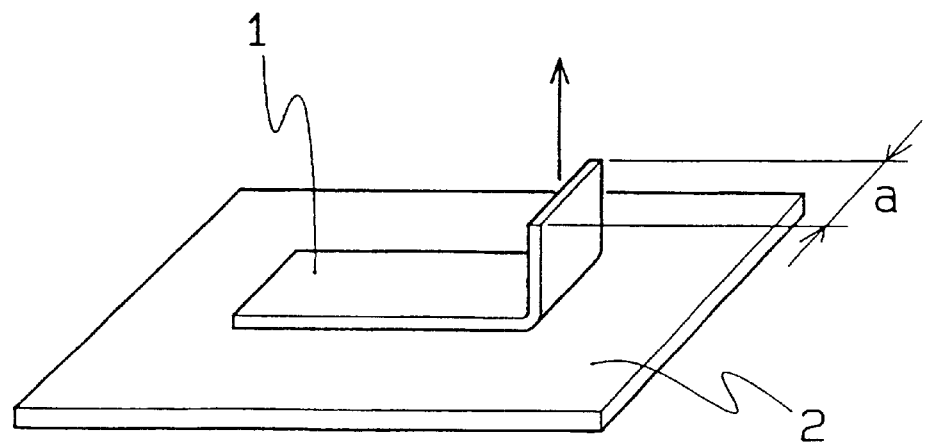
FIG. 2 is a diagrammatic perspective view of a test sample used to measure adhesive strength in Example 7 of the present invention.

EXAMPLE 7
Evaluation of Adhesive Property of PFA Powder Coating Composition Having Hydroxyl)
1) Production of Press Sheet for Adhesion Test About 4 g of the PFA powder coating composition having hydroxyl and prepared in Preparation Example 7 was put in a cylindrical metal mold of 60 mm diameter and compression-molded at room temperature at a pressure of 300 kgf/cm$^2$ with a press machine to give a disc-like cold press sheet (hereinafter also referred to as "PFA sheet").
(2) Pre-treatment of Substrate A pure aluminum plate of 100×100×1 (mm) was degreased with acetone and then subjected to sand blasting.
(3) Production of Adhered Sample The PFA sheet obtained in (1) above was placed on the aluminum plate ((2) above) and put in a hot air dryer to heat to melt at 330° C. for 10 minutes. Thus a sample produced by adhering the PFA sheet of about 450 μm thick to the aluminum plate was obtained. FIG. 1 shows a diagrammatic plan view of the adhered plate comprising the PFA sheet 1 and the aluminum plate 2.
(4) Measurement of Adhesive Strength As shown in FIG. 1, the PFA sheet 1 of the adhered sample obtained in (3) above was cut with a cutter at intervals of a width a (10 mm) and one end of each strip-like sheet 1 was folded up, thus giving a test sample for measuring adhesive strength. FIG. 2 shows a diagrammatic perspective view of the test sample for measuring adhesive strength. As shown in FIG. 2, the sheet 1 was pulled up at an angle of 90° to the aluminum plate 2 to measure peeling strength. The adhesive strength was measured at room temperature at a cross head speed of 50 mm/min with TENSILON Universal Tester (available from Orientec Corporation). An adhesive strength was 5.5 kgf/cm as an average value of peel by area method.

COMPARATIVE EXAMPLE 4
(Evaluation of Adhesive Property of PFA Powder Coating Composition Having No Functional Group)

Production of a press sheet for adhesion test, pre-treatment of a substrate and production of an adhered sample were carried out in the same manner as in Example 7 except that the powder coating composition of PFA having no functional group and prepared in Preparation Example 8 was used instead of the powder coating composition of PFA having hydroxyl and prepared in Preparation Example 7. Then adhesive strength was measured.

Adhesive strength of the powder coating composition of PFA having no functional group was 0.8 kgf/cm.

EXAMPLE 8
(Electrostatic Coating of PFA Powder Coating Composition Having Hydroxyl)

Electrostatic coating of the PFA powder coating composition having hydroxyl and prepared in Preparation Example 7 was carried out on an aluminum plate pre-treated in the same manner as in Example 7 at room temperature at a voltage of 40 kV with an electrostatic coating machine (Model GX3300 available from Iwata Toso Kabushiki Kaisha).

The coated plate was sintered at 330° C. for 15 minutes with a hot air dryer to give a coating film.

The coating film was a continuous uniform transparent film and was adhered strongly to the aluminum plate.

COMPARATIVE EXAMPLE 5
(Heat Resistance of Fluorine-containing Polymer Prepared by Using Non-fluorine-containing Monomer Having Functional Group)

Thermal decomposition temperature of the fluorine-containing polymer prepared in Preparation Example 9 was measured through TGA analysis, and 1% thermal decomposition temperature thereof was 220° C. From this, it was seen that heat resistance of the fluorine-containing polymer prepared by using a non-fluorine-containing monomer having functional group like the polymer obtained in Preparation Example 9 was low.

Further the fluorine-containing copolymer obtained in Preparation Example 9 was dissolved in butyl acetate in a concentration of 10% by weight.

Pre-treatment of a pure aluminum substrate, application of a primer layer comprising the fluorine-containing copolymer of Preparation Example 9 and application (electrostatic coating of PFA powder coating composition) of a top layer were carried out in the same manner as in Example 5 except that for the primer layer, the above-mentioned butyl acetate solution of the fluorine-containing copolymer of Preparation Example 9 was used instead of the aqueous dispersion of PFA having hydroxyl.

A coating film obtained by sintering at 380° C. for 20 minutes after the application was colored yellow-brown, and foaming and peeling were also seen. Thus a uniform transparent coating film could not be obtained.

EXAMPLES 9 to 12
(Adhesion Test of PFA Film Having Hydroxyl to Metal)

Adhesion test of a PFA film having hydroxyl (film of Preparation Example 10 or 11) was carried out in the manner mentioned below by using, as a metal plate, degreased chromate-treated aluminum, pure aluminum and steel plates of 0.5 mm thick. The results are shown in Table 4.
(Production of Test Piece for Peeling Test)

Figure 3:
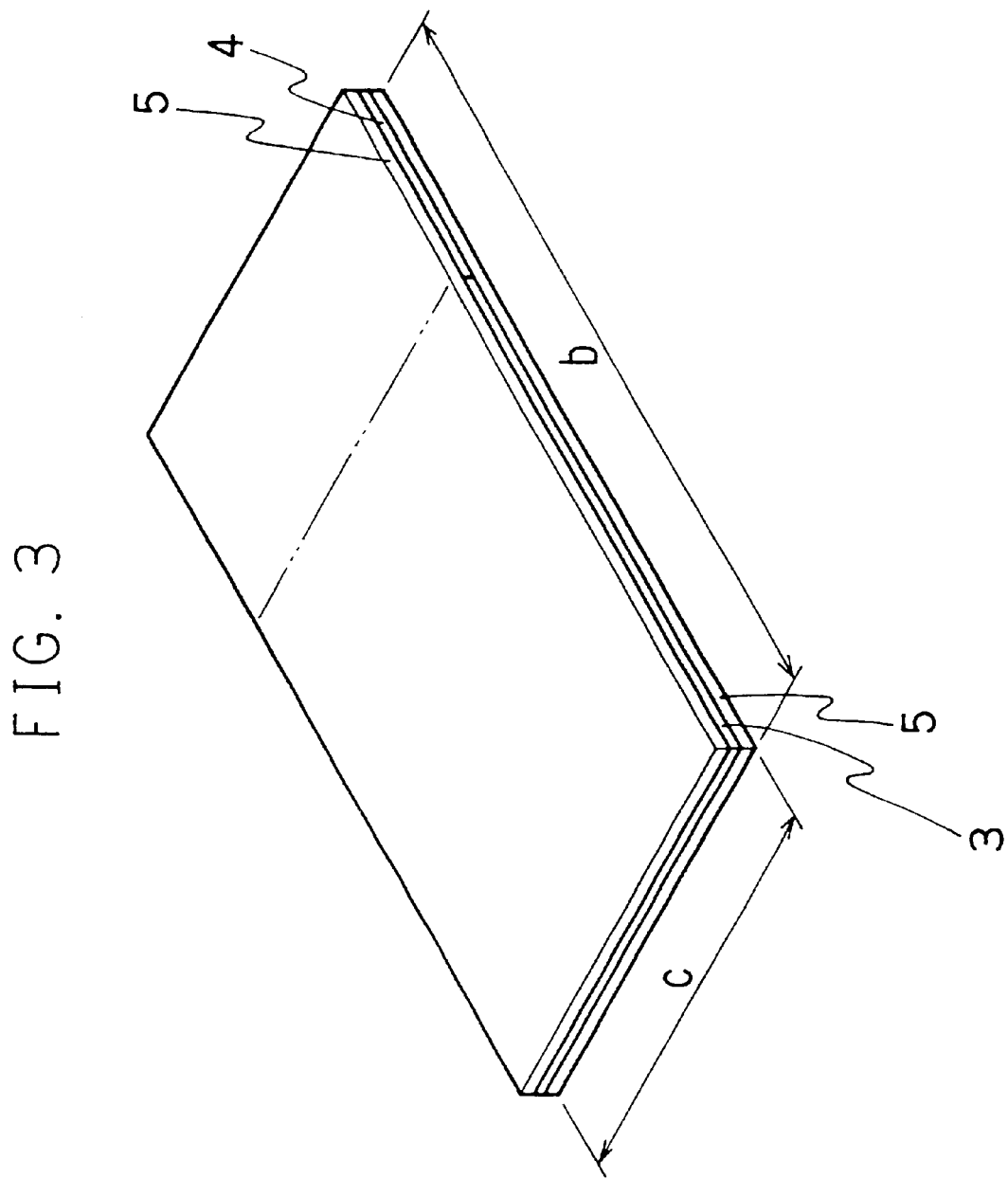
FIG. 3 is a diagrammatic perspective view of a laminated article made to produce a test piece to be subjected to adhesion test (T-type peeling test) in the present invention.

FIG. 3 is a diagrammatic perspective view of a laminated article made to produce a test piece for peeling test. As shown in FIG. 3, the PFA film having hydroxyl and obtained in Preparation Example 10 or 11 as an adhesive layer 3 and a 0.1 mm thick spacer 4 (aluminum foil) were put between the two metal plates 5 and then set on a press machine of 350° C., followed by preheating (20 minutes) and then compressing at 50 kg/cm² for one minute to give a laminated article of length b (150 mm)×width c (70 mm).

Figure 4:
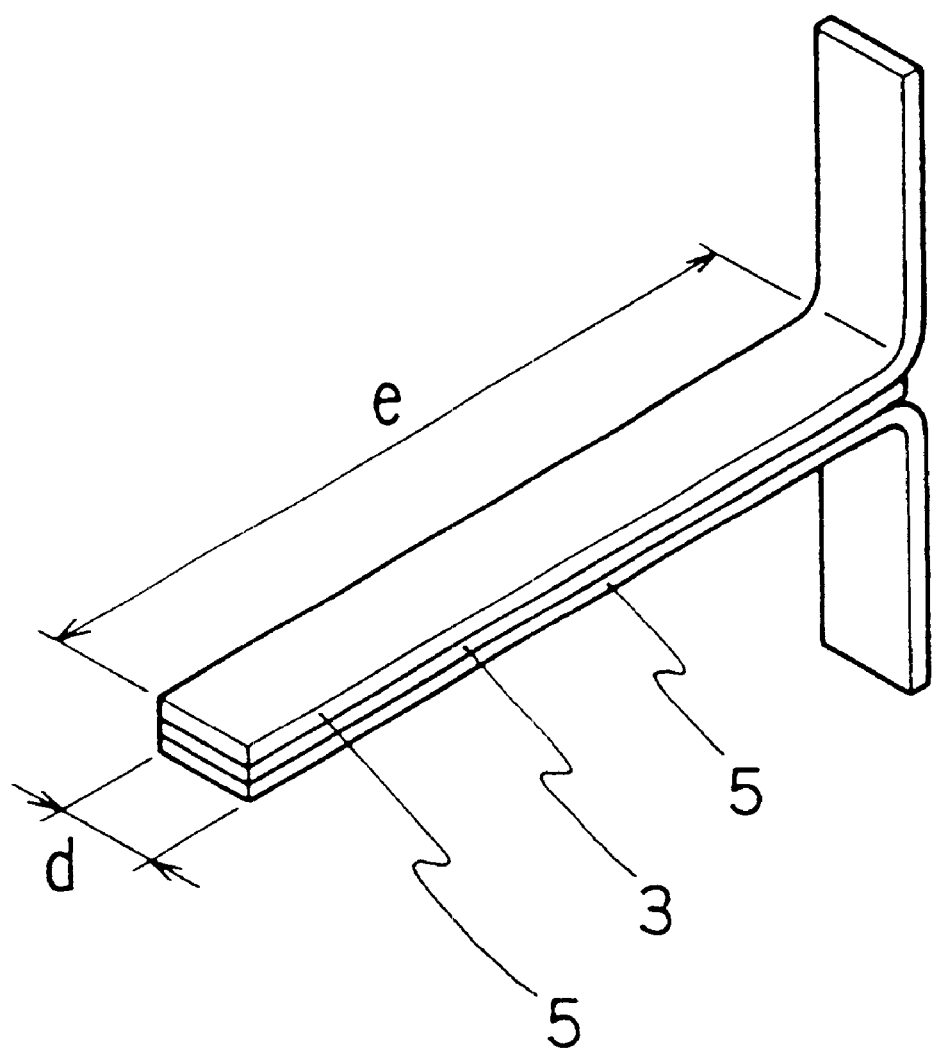
FIG. 4 is a diagrammatic perspective view of a test piece to be subjected to adhesion test (T-type peeling test) in the present invention.

Each thickness of the adhesive layer 3 of the obtained laminated articles was 0.1 mm. Further the laminated article was cut to a width of 25 mm and the spacer portion was bent in the shape of T at a point apart by a distance e (100 mm) from one end of the laminated article to give a test piece for the peeling test. FIG. 4 is a diagrammatic perspective view of the obtained test piece for peeling test. In FIG. 4, numeral 3 represents the adhesive layer and numeral 5 represents the metal plates.

(Peeling Test)

The peeling test was carried out at room temperature at a cross head speed of 50 mm/min by using TENSILON Universal Tester available from Orientec Corporation according to T-type peeling test method of JIS K6854-1977. The results show the maximum peeling strength (kgf/25 mm) and minimum peeling strength (kgf/25 mm)

COMPARATIVE EXAMPLES 6 to 8

(Adhesion Test of PFA Film Having No Functional Group to Metal)

Production of test pieces and peeling test were carried out in the same manner as in Example 9 except that the PFA film having no functional group and obtained in Preparation Example 12 was used instead of the PFA film having hydroxyl and obtained in Preparation Example 10 or 11. The results are shown in Table 4.

Figure 6:
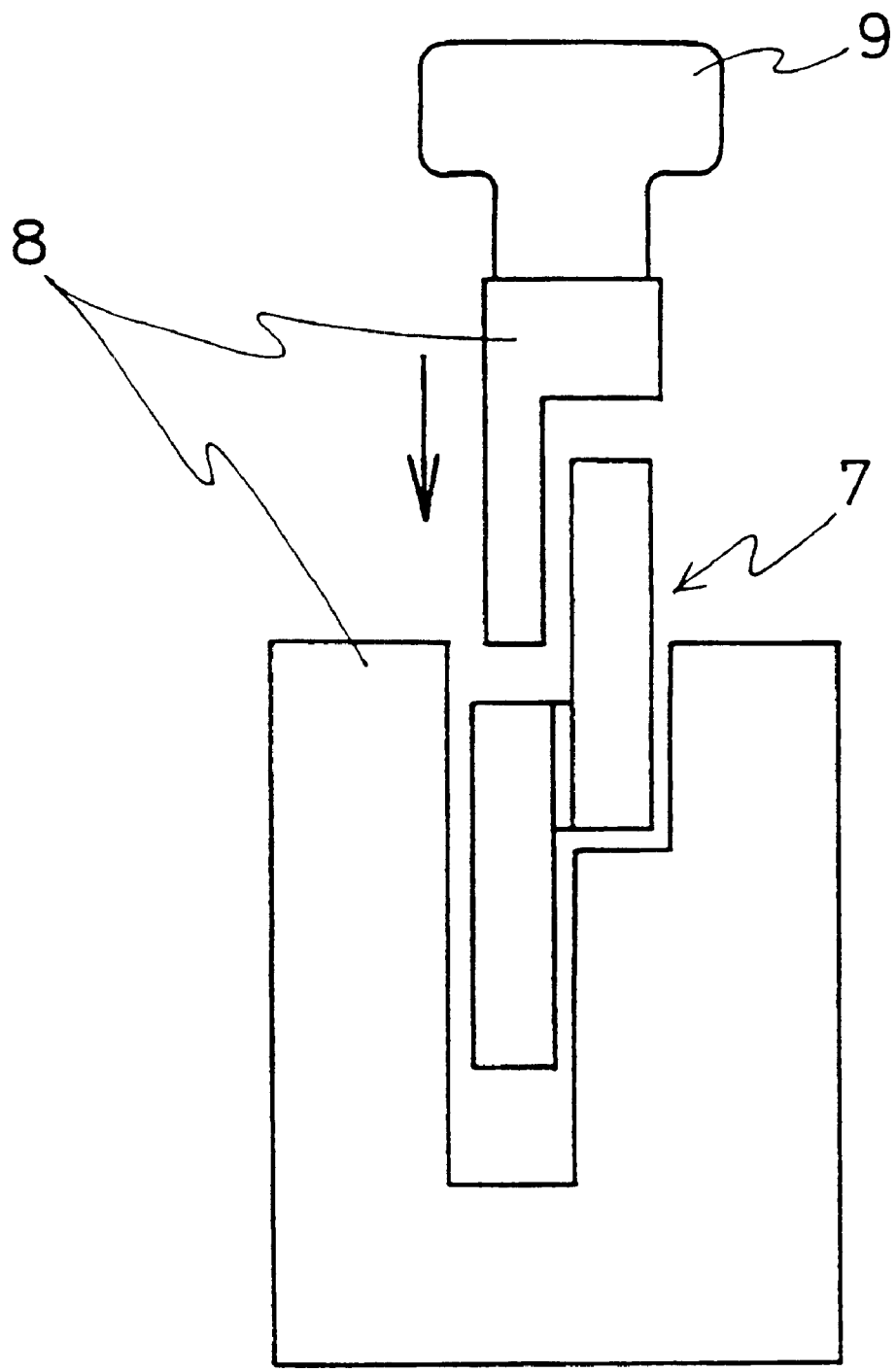
FIG. 6 is a diagrammatic view of a test device to be used for adhesion test (tensile shear strength test) in the present invention.

FIG. 6 is a diagrammatic perspective view of a test device to be used for measuring adhesive strength by tensile shearing method. As shown in FIG. 6, a test jig 8 matching the shape of the test piece 7 obtained as mentioned above was set on TENSILON Universal Tester 9 available from Orientec Corporation, and then the tensile shearing test was carried out at a cross head speed of 20 mm/min. The results of the measurement are shown by maximum adhesive strength (kgf/cm²).

(Hot Water Resistance Test)

The test piece obtained as mentioned above was dipped in 50° C. hot water to check to see adhesion after a lapse of 6 hours and measure adhesive strength (kgf/cm²) after a lapse of 72 hours.

(Methanol Dipping Test)

The test piece obtained as mentioned above was dipped in methanol of room temperature to check to see its adhesion.

COMPARATIVE EXAMPLE 9

(Adhesion of PFA Film Having No Functional Group to Glass)

Production of a test piece and various tests were carried out in the same manner as in Example 13 except that the PFA film having no functional group and obtained in Preparation Example 12 was used instead of the PFA film having hydroxyl and obtained in Preparation Example 10 or 11. The results are shown in Table 5.

TABLE 4

|  | Ex. 9 | Ex. 10 | Com. Ex. 6 | Ex. 11 | Com. Ex. 7 | Ex. 12 | Com. Ex. 8 |
| --- | --- | --- | --- | --- | --- | --- | --- |
| Kind of fluorine-containing adhesive | Prep. Ex. 10 | Prep. Ex. 11 | Prep. Ex. 12 | Prep. Ex. 10 | Prep. Ex. 12 | Prep. Ex. 10 | Prep. Ex. 12 |
| Kind of metal plate | Chromate-treated aluminum | Chromate-treated aluminum | Chromate-treated aluminum | Pure aluminum | Pure aluminum | Dull-finished steel sheet | Dull-finished steel sheet |
| Maximum peeling strength (kgf/25 mm) | 15.4 | 11.3 | 1.8 | 9.5 | 1.5 | 22.4 | 2.0 |
| Minimum peeling strength (kgf/25 mm) | 7.2 | 2.1 | 0.18 | 2.5 | 0.15 | 12.4 | 0.20 |

EXAMPLES 13 to 14

(Adhesion Test of PFA Film Having Hydroxyl to Glass)

Adhesion test of PFA having hydroxyl to Pyrex glass plate of 30×20×5 mm was carried out in the manner mentioned below.

Further hot water resistance test and methanol dipping test of the laminated article after the adhesion were carried out. The results are shown in Table 5.

(Production of Test Piece for Tensile Shear Test)

Figure 5:
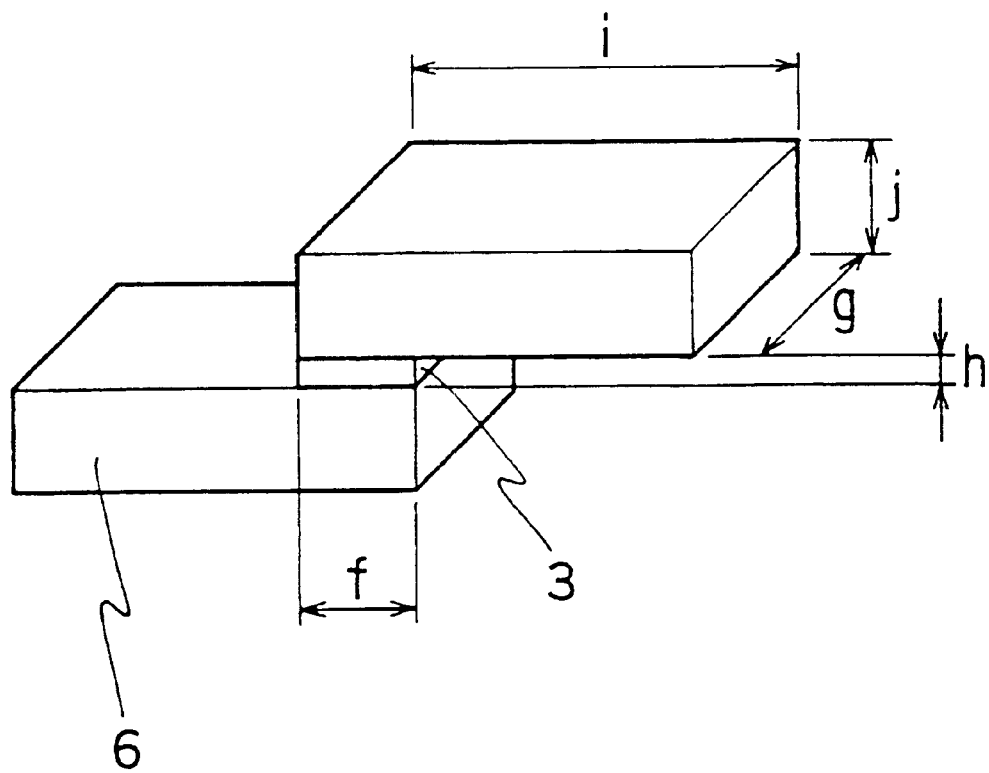
FIG. 5 is a diagrammatic perspective view of a test piece to be subjected to adhesion test (tensile shear strength test) in the present invention.

FIG. 5 is a diagrammatic perspective view of a test piece for tensile shear test. As shown in Table 5, the PFA film having hydroxyl as an adhesive layer 3 which was obtained in Preparation Example 10 or 11 (length f of 10 m, width g of 20 mm, thickness h of 0.1 mm) was put between the Pyrex glass plates 6 (length i of 30 m, width g of 20 mm, thickness j of 5 mm), and a load of 3 kg was applied, followed by allowing to stand at 350° C. for 30 minutes in an electric oven to give a test piece. A thickness of the adhesive layer 3 was adjusted to 0.1 mm with a spacer.

(Adhesive Strength)

TABLE 5

|  | Ex. 13 | Ex. 14 | Com. Ex. 9 |
| --- | --- | --- | --- |
| Kind of fluorine-containing adhesive | Prep. Ex. 10 | Prep. Ex. 11 | Prep. Ex. 12 |
| Kind of substrate | Pyrex glass | Pyrex glass | Pyrex glass |
| Adhesion strength (kgf/cm²) | 83 or more Breaking of glass | 83 or more Breaking of glass | 59 Peeling |
| Hot water resistance test (50° C.) |  |  |  |
| 6 hours after | Adhesion was maintained. | Adhesion was maintained. | Spontaneous peeling |
| Adhesive strength (kgf/cm²) after 72-hour dipping | 63 | 10 | — |

TABLE 5-continued

|  | Ex. 13 | Ex. 14 | Com. Ex. 9 |
|---|---|---|---|
| Methanol dip test (room temperature) | | | |
| 24 hours after | Adhesion was maintained. | — | Spontaneous peeling |
| 72 hours after | Adhesion was maintained. | — | — |

EXAMPLE 15
(Tests for Adhesion and Post-processability after Lamination of PFA Film Having Hydroxyl to Stainless Steel)

A laminated test piece was produced in the manner mentioned below by using a degreased SUS304 stainless steel plate of 150 mm long×70 mm wide×0.5 mm thick as a metal plate. The PFA film having hydroxyl and produced in Preparation Example 13 and the PFA film having no functional group and produced in Preparation Example 14 were cut to the same size as the above-mentioned SUS plate.

Further a polyimide film (Kapton 200-H available from E.I. Du Pont de Nemours & Co.) which was used for separation was also cut to the same size as above.

Figure 7:
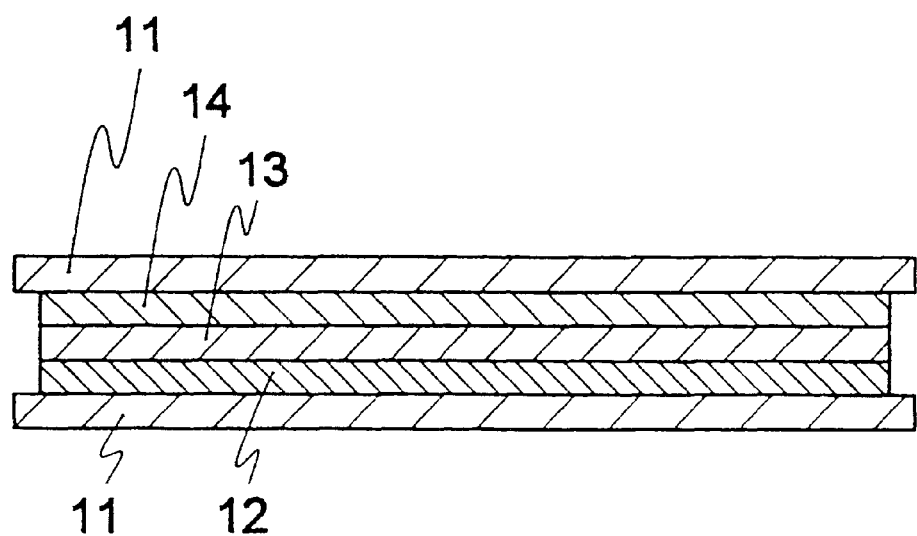
FIG. 7 is a diagrammatic cross-sectional view of a laminated test plate made in Example 15 of the present invention.

FIG. 7 is a diagrammatic cross-sectional view of an obtained laminated test plate. As shown in FIG. 7, the PFA film 12 having hydroxyl, the PFA film 13 having no functional group and the polyimide film 14 were put between the two SUS plates 11, and then set on a press machine preset at 350° C., followed by preheating (20 minutes) and then pressing at 50 kg/cm$^2$ for one minute to give a laminated test plate.

After cooling, when the SUS plate 11 contacting the polyimide film 14 was removed, the polyimide film was peeled from the interface with the PFA film 13 having no functional group spontaneously.

Figure 8:
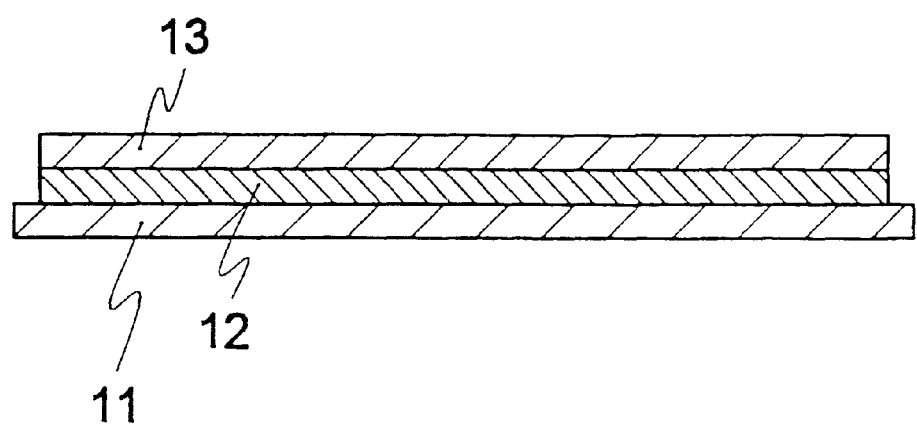
FIG. 8 is a diagrammatic cross-sectional view of a three-layered laminated article made in Example 15 of the present invention.

As a result, a three-layered laminated article having good transparency and comprising the PFA film 12 having hydroxyl as an adhesive layer, the SUS plate 11 and the PFA film 13 was obtained. FIG. 8 is a diagrammatic cross-sectional view of the obtained three-layered laminated article.

Further the obtained three-layered laminated article was cross-cut with a cutting knife so that a cut depth reached the surface of the SUS plate 11, and a hundred pieces of 1 mm squares of lattice pattern were made. A center of the square was pushed out by 5 mm with Erichsen tester. As a result, the PFA film 12 having hydroxyl was not peeled off at all and kept adhered strongly to the SUS plate 11 which was a substrate.

The PFA film 12 exhibited strong adhesion to the SUS plate

COMPARATIVE EXAMPLE 10
(Tests for Adhesion and Post-processability after Lamination of PFA Film Having No Functional Group to Stainless steel)

Figure 9:
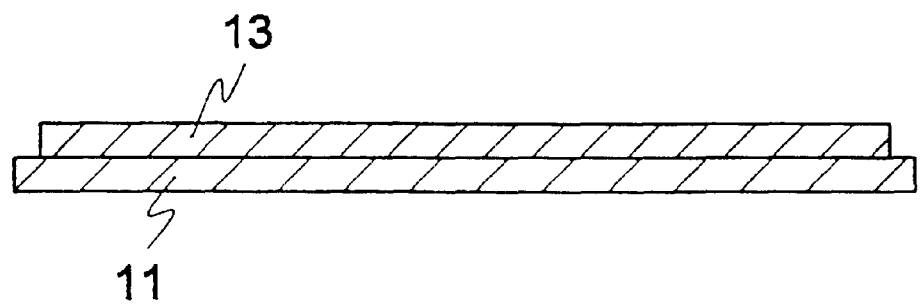
FIG. 9 is a diagrammatic cross-sectional view of a laminated article made in Comparative Example 10 of the present invention.

A laminated article comprising the SUS plate 11 and the PFA film 13 having no functional group was produced in the same manner as in Example 15 except that the PFA film having hydroxyl was not used. FIG. 9 is a diagrammatic cross-sectional view of the obtained laminated article.

The PFA film 13 having no functional group seemed to be adhered, but could be peeled off from the SUS plate 11 easily.

Further Erichsen test was carried out in the same manner as in Example 15, and 60 pieces among 100 cross-cut squares were peeled off from the cut line.

EXAMPLE 16
(Adhesion Test of PFA Film Having Hydroxyl and Polyimide Film)

Figure 10:
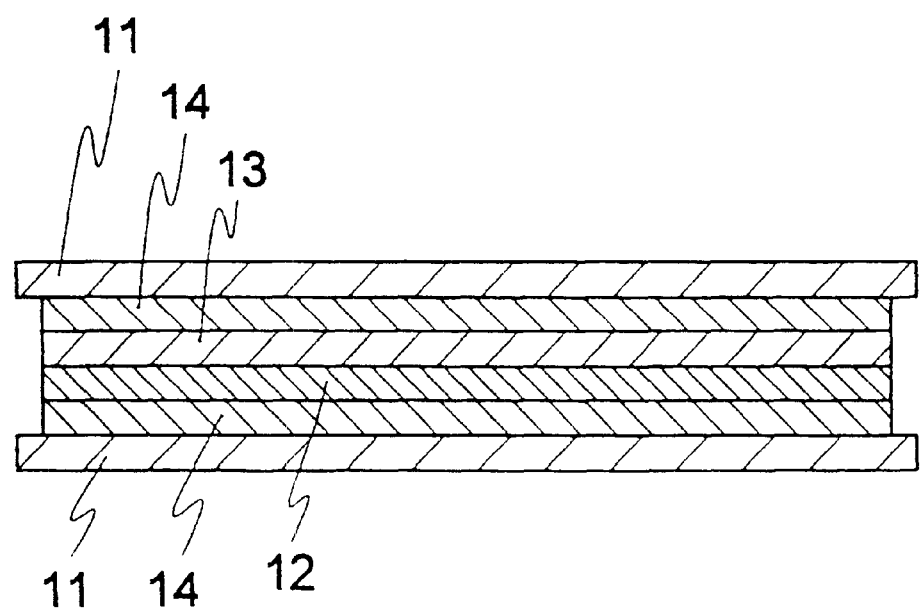
FIG. 10 is a diagrammatic cross-sectional view of a laminated test plate for making a laminated article in Example 16 of the present invention.
Figure 11:
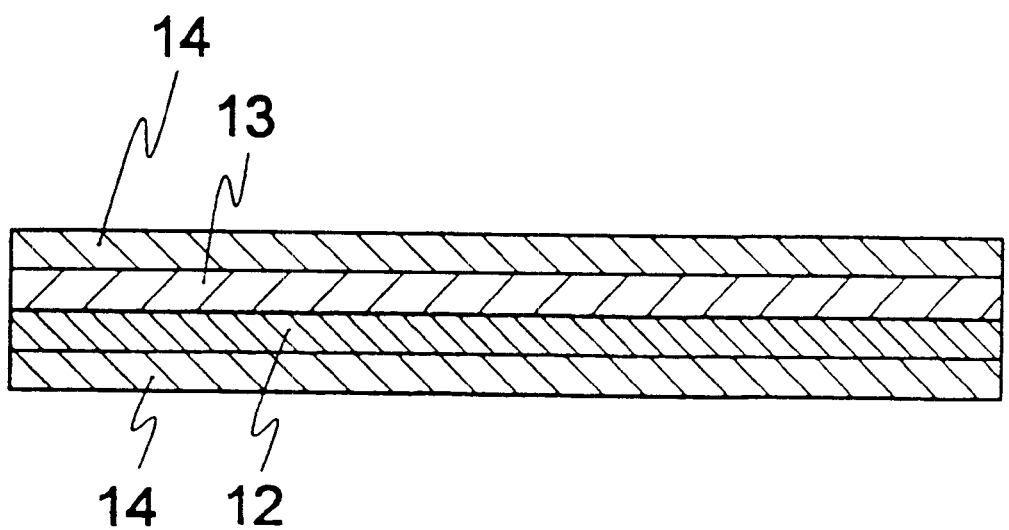
FIG. 11 is a diagrammatic cross-sectional view of a laminated article made in Example 16 of the present invention.

The PFA film 12 having hydroxyl and obtained in Preparation Example 13, the PFA film 13 having no functional group and obtained in Preparation Example 14 and the polyimide film 14 were cut to the same size as in Example 15, and put between the two SUS plates 11, followed by heating with a press machine in the same manner as in Example 15 to give a laminated test plate. FIG. 10 shows a diagrammatic cross-sectional view of the obtained laminated test plate. Then after cooling, the SUS plate 11 was removed to obtain a laminated article. FIG. 11 is a diagrammatic cross-sectional view of the obtained laminated article. Further the laminated article was cut to a width of 25 mm.

Figure 12:
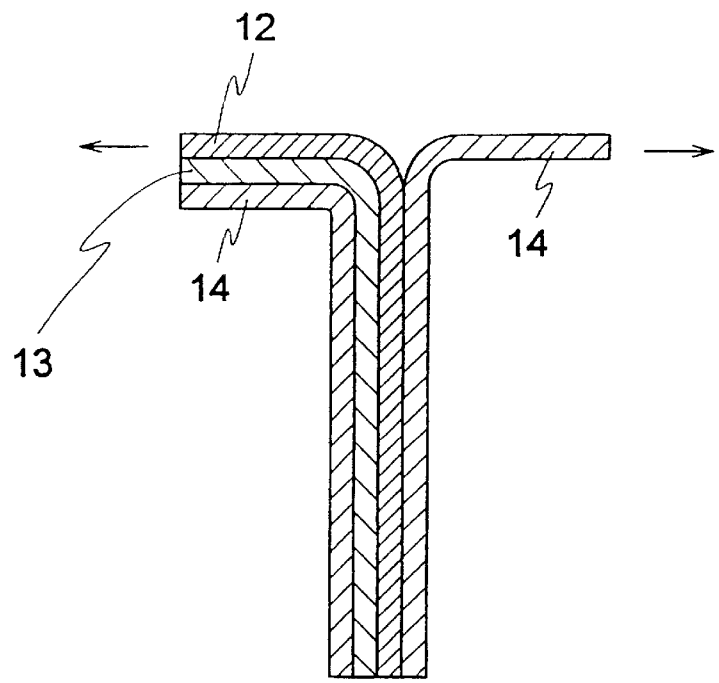
FIG. 12 is a diagrammatic cross-sectional view of a laminated article to be subjected to T-type peeling test in Example 16 of the present invention.

FIG. 12 is a diagrammatic cross-sectional view of the above-mentioned laminated article to be subjected to T-type peeling test. In FIG. 12, a part of interface between the polyimide film 14 and the PFA film 12 having hydroxyl was peeled, and the T-type peeling test by peeling in the direction of an arrow shown in FIG. 12 was carried out in the same manner as in Example 1. The adhesive strength was 4.0 kgf/25 mm as an average value of peel according to area method.

COMPARATIVE EXAMPLE 11
(Adhesion Test of PFA Film Having No Functional Group to Polyimide Film)

Figure 13:
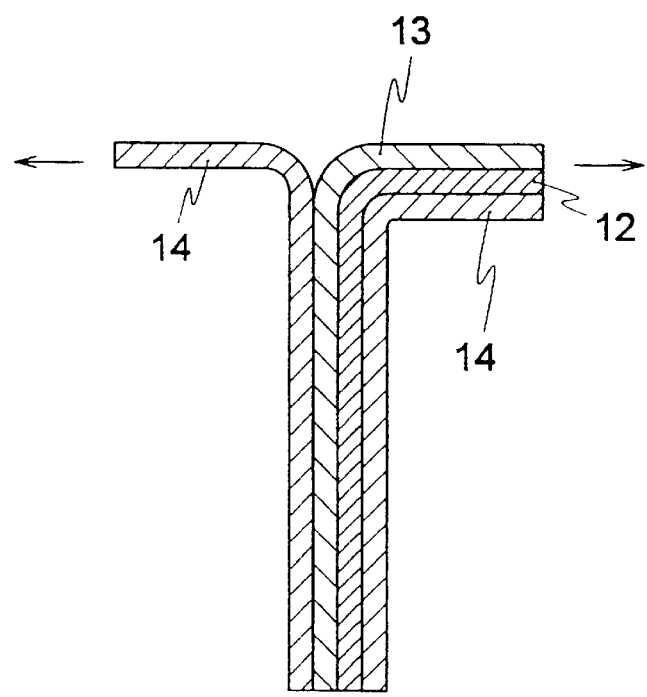
FIG. 13 is a diagrammatic cross-sectional view of a laminated article to be subjected to T-type peeling test in Comparative Example 10 of the present invention.

FIG. 13 is a diagrammatic cross-sectional view of a laminated article to be subjected to T-type peeling test in the same manner as in Example 1. In FIG. 13, a part of interface between the polyimide film 14 and the PFA film 13 having no functional group of the 25 mm wide laminated article obtained in Example 16 was peeled, and the T-type peeling test by peeling in the direction of an arrow shown in FIG. 13 was carried out in the same manner as in Example 16, but no adhesive property was exhibited.

COMPARATIVE EXAMPLE 12
(Heat Resistance of Fluorine-containing Polymer Prepared by Using Non-fluorine-containing Monomer Having Functional Group)

A thermal decomposition temperature of the fluorine-containing polymer obtained in Preparation Example 9 was measured through TGA analysis, and 1% thermal decomposition temperature was 220° C. From that, it was seen that the fluorine-containing polymer as prepared in Preparation Example 9 by using a non-fluorine-containing monomer having functional group has low heat resistance.

Further the fluorine-containing polymer prepared in Preparation Example 9 was dissolved in butyl acetate in a concentration of 10% by weight.

To the aluminum plate pre-treated in the same manner as in Example 9 was applied the above-mentioned butyl acetate solution of fluorine-containing polymer of Preparation Example 9 by an air spray so that a coating thickness would become about 10 μm, followed by infrared-drying at 90° C. for 10 minutes.

Figure 14:
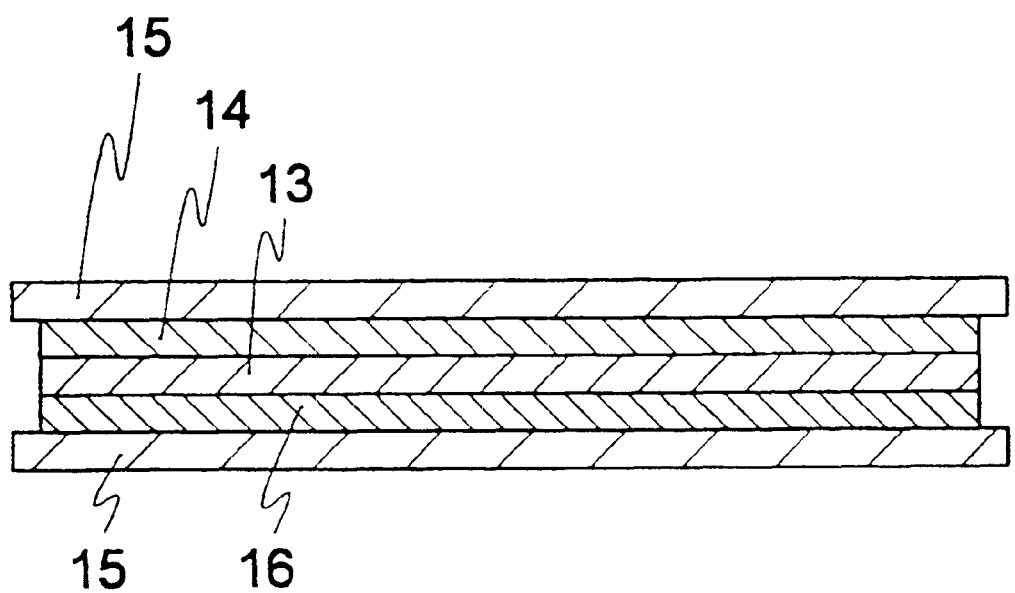
FIG. 14 is a diagrammatic cross-sectional view of a laminated test plate made in Comparative Example 12 of the present invention.

On the coating film 16 of the fluorine-containing polymer prepared by using a non-fluorine-containing monomer having functional group were placed in order the PFA film 13 having no functional group and prepared in Preparation Example 14, the polyimide film 14 for separation (same as in Example 15) and the aluminum plate 15, followed by heating and pressing at 350° C. with a press machine in the same manner as in Example 15 to give a laminated test plate. A diagrammatic cross-sectional view of the obtained laminated test plate is shown in FIG. 14.

After cooling the laminated test plate, the aluminum plate 15 contacting the polyimide film 14 and the polyimide film 14 were removed to give a laminated article.

The obtained laminated article was colored yellow-brown, and foaming and peeling occurred between the PFA film 13 and the aluminum plate 15. Thus a uniform transparent laminated article could not be obtained.

EXAMPLES 17 to 18

Non-stickiness test was carried out through the method mentioned below by using a coated plate (Example 17) produced by electrostatically coating a PFA powder coating composition having hydroxyl and obtained in Example 8 and an extruded film (Example 18) of PFA having hydroxyl and obtained in Preparation Example 13. The results are shown in Table 6.

(Non-stickiness Test)

Figure 15:
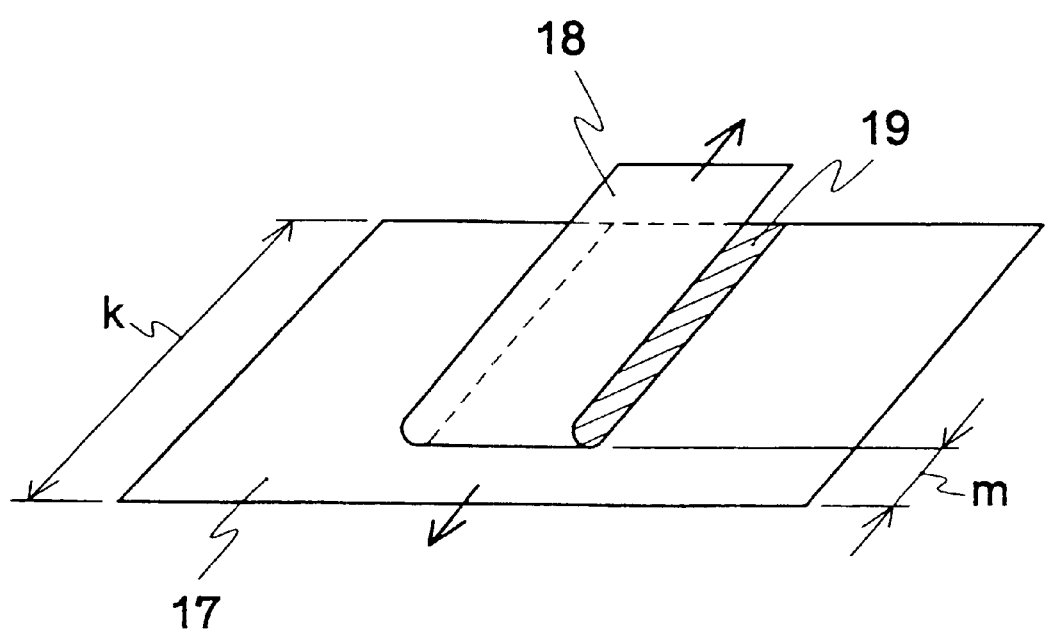
FIG. 15 is a diagrammatic perspective view of a test piece to be subjected to non-stickiness test in Example of the present invention.

Measurement was made at 23° C.±2° C. FIG. 15 is a diagrammatic perspective view of a test piece used in the non-stickiness test. A test plate 17 was 150 mm or more in length, and stain thereon was wiped off with acetone. First a 18 mm wide adhesive tape 18 (JIS Z 1522) was cut to a length of 300 mm, and only 150 mm long portion k was placed on the test piece 17. The surface of the tape 18 was rubbed with a rubber eraser of JIS S 6050 to adhere the tape to the test piece to give an adhered portion 19. A paper was attached to the remaining 150 mm portion (not described) to make handling easy. After the adhering, the adhered test piece was allowed to stand for about 20 minutes to adhere the tape 18 to the test piece 17 sufficiently. The tape 18 was peeled up to a width m of 25 mm from the end of the test piece 17 and the test piece 17 was mounted on a clamping device at the bottom of the tensile tester. The end of the peeled tape 18 was folded by 180° and fitted to an upper clamping device so that the tape 18 can be peeled straight. A peeling force of the tape 18 from the test piece 17 was measured with the tester at a stretching speed of 20 mm/min. The measured value is an average of measurement when the tape 18 is peeled smoothly. The results are shown in Table 6.

COMPARATIVE EXAMPLE 13 to 14

(Non-stickiness Test of PFA Film Having No Functional Group)

A non-stickiness test was carried out in the same manner as in Example 17 by using an extruded PFA film having no functional group and obtained in Preparation Example 14 (Comparative Example 13) and a non-coated glass plate (Comparative Example 14). The results are shown in Table 6.

TABLE 6

|  | Ex. 17 | Ex. 18 | Com. Ex. 13 | Com. Ex. 14 |
| --- | --- | --- | --- | --- |
| Test sample | Ex. 8 Plate coated with PFA powder coating composition having hydroxyl | Prep. Ex. 13 PFA film having hydroxyl | Prep. Ex. 14 PFA film having no functional group | — Glass plate |

TABLE 6-continued

|  | Ex. 17 | Ex. 18 | Com. Ex. 13 | Com. Ex. 14 |
| --- | --- | --- | --- | --- |
| Non-stickiness (gf/18 mm) | 240 | 235 | 230 | 300 |

From Table 6, it was seen that PFA having OH group also has nearly the same excellent non-sticking property as PFA having no functional group.

EXAMPLES 19 to 20

Carbon contamination test and weather resistance test (only Example 20) were carried out through the method mentioned below by using, as a test plate (or film), the plate electrostatically coated with a PFA powder coating composition having hydroxyl which was obtained in Example 8 (Example 19) and the extruded PFA film having hydroxyl and obtained in Preparation Example 13 (Example 20).

① Carbon Contamination Test (Preparation of Carbon Solution)

Ten grams of a carbon powder (MA100 available from Mitsubishi Chemical Co., Ltd.) was added to 90 g of ion-exchanged water, and dispersed and mixed by using glass beads to give a dispersion of carbon.

(Coating of Carbon)

The dispersion of carbon was sprayed to the above-mentioned coated plate or the film at about 50 g/m² and heated at 80° C. for two hours to give a black test plate or film.

(Evaluation)

The obtained black test plate was exposed to flowing water and washed with a brush. Then a degree of contamination was observed with naked eyes and evaluated by the following criteria. The results are shown in Table 7.

○: Contamination can be eliminated by washing, and the coated plate or film returned to nearly the state before the contamination test.

Δ: A part of contamination could be removed by washing, but a gray stain is attached to a whole surface of the coated plate or film as if it was soaking into the plate or film. The stain could not be removed.

×: A black stain remained over the surface of the coated plate or film, and could not be removed by washing with water.

② Weather Resistance Test

The above-mentioned coated plate or film was put in I-SUPER UV tester (available from Iwasaki Denki Kabushiki Kaisha) and an accelerated weather resistance test was carried out to measure a water contact angle to the coated plate after having allowed to stand for 500 hours. The results are shown in Table 7.

COMPARATIVE EXAMPLE 15

After the same aluminum plate as in Example 7 was subjected to 80 to 120 mesh sand blasting, a primer (POLYFLON TFE Enamel EK-1959 DGN available from DAIKIN INDUSTRIES, LTD) was sprayed to the plate and the coated plate was dried at 90° C. in an infrared drying oven to form a primer layer.

After a PFA powder coating composition (NEOFLON Powder Coating Composition ACX-31 available from DAIKIN INDUSTRIES, LTD.) was electrostatically coated on the primer layer, the coated plate was subjected to sintering at 350° C. for 30 minutes to give a plate having a coating film of PFA powder coating composition and a primer of grayish brown color.

Also with respect to the plate coated with a PFA powder coating composition, a carbon contamination test was carried out in the same manner as in Example 19. The results are shown in Table 7.

COMPARATIVE EXAMPLE 16

A clear coating composition adjusted to OH/NCO ratio= 1:1 was prepared by mixing 100 g of ZEFFLE GK510 (available from DAIKIN INDUSTRIES, LTD., OH value: 60) which is a varnish for cold curing type fluorine-containing coating composition, 10.5 g of isocyanate curing agent CORONATE HX (available from Nippon Polyurethane Co., Ltd.) and 120 g of butyl acetate.

The above-mentioned clear coating composition was spray-coated to an aluminum plate sand-blasted in the same manner as in Comparative Example 7, followed by sintering at 120° C. for 30 minutes to give a coated plate on which a coating film was formed. Also the same tests as in Example 20 were carried out by using the coated plate. The results are shown in Table 7.

COMPARATIVE EXAMPLE 17

A coating composition adjusted to OH/NCO ratio=1:1 was prepared by mixing 100 g of ACRYDICK A801 (available from Dai-Nippon Ink Co., Ltd., OH value: 100) which is a varnish for cold curing type acrylic resin coating composition, 17 g of isocyanate curing agent CORONATE HX (same as in Comparative Example 4) and 120 g of butyl acetate. Spray-coating to an aluminum plate and sintering were carried out in the same manner as in Comparative Example 16 by using the obtained composition to give a coated plate on which a coating film was formed.

Also the same tests as in Example 20 were carried out by using the coated plate. The results are shown in Table 7. From Table 7, it was seen that the fluorine-containing polymer having functional group of the present invention also has good non-sticking property against a carbon powder.

TABLE 7

|  | Ex. 19 | Ex. 20 | Com. Ex. 15 | Com. Ex. 16 | Com. Ex. 17 |
|---|---|---|---|---|---|
| Test sample | Plate coated with PFA powder coating composition having hydroxyl of Example 8 | PFA film having hydroxyl of Preparation Example 13 | Plate having a PFA powder coating composition layer adhered by using a commercially available primer | Plate coated with a cold curing type fluorine-containing resin coating composition | Plate coated with a cold curing type acrylic resin coating composition |
| Appearance | Transparent | Transparent | Grayish brown | Transparent | Transparent |
| Evaluation in carbon contamination test | ○ | ○ | ○ | Δ | Δ–x |
| Water contact angle (degree) | 113 | 115 | 102 | 92 | 80 |
| Water contact angle in weather resistance test (degree) | — | 113 | — | 85 | 20 or lower |

EXAMPLE 21

(Heat Resistance of Adhesion of Plate Coated with PFA Powder Coating Composition Having Hydroxyl)

(1) Production of Plate Coated with a Powder Coating Composition

An aluminum plate pre-treated in the same manner as in Example 7 was coated with a powder coating composition of PFA having hydroxyl and prepared in Preparation Example 7 at room temperature at a voltage of 40 kV by electrostatic coating by using an electrostatic powder coating machine (the same machine as in Example 8). The coated aluminum plate was sintered at 330° C. for 15 minutes to give a coating film. On the obtained coating film was applied a powder coating composition of PFA having no functional group (NEOFLON PFA Powder Coating Composition ACX-31 available from DAIKIN INDUSTRIES, LTD) by electrostatic coating in the same manner as above, followed by sintering at 380° C. for 20 minutes to give a transparent coating film having a total thickness of 159 μm.

(2) Measurement of Adhesive Strength

Figure 16:
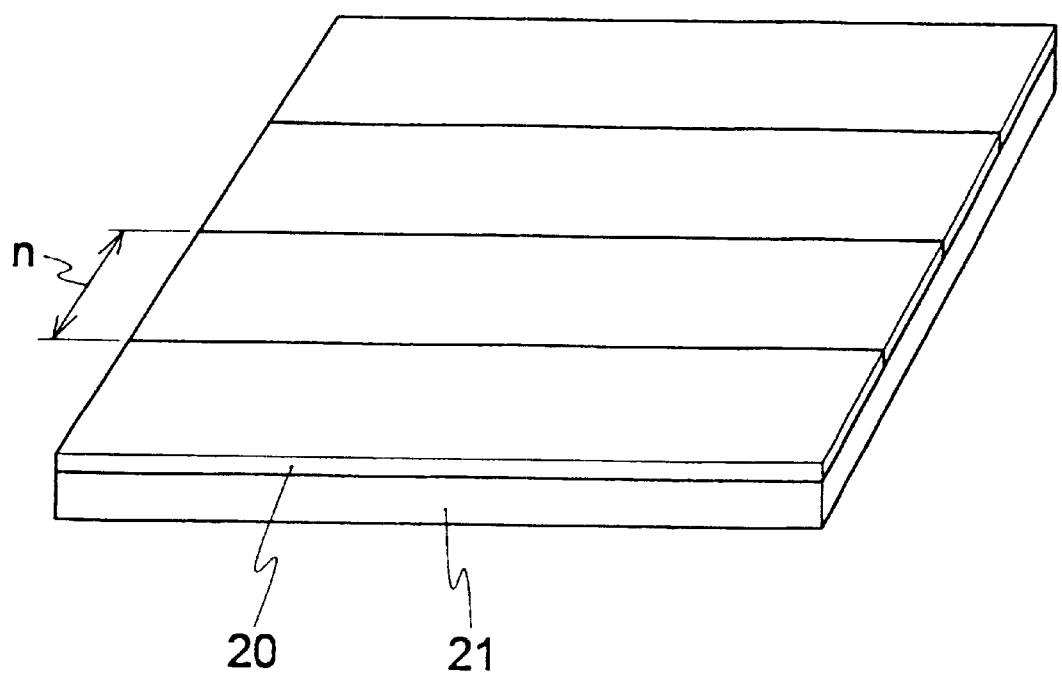
FIG. 16 is a diagrammatic perspective view of an aluminum plate having a coating film obtained in (1) of Example 21 of the present invention.
Figure 17:
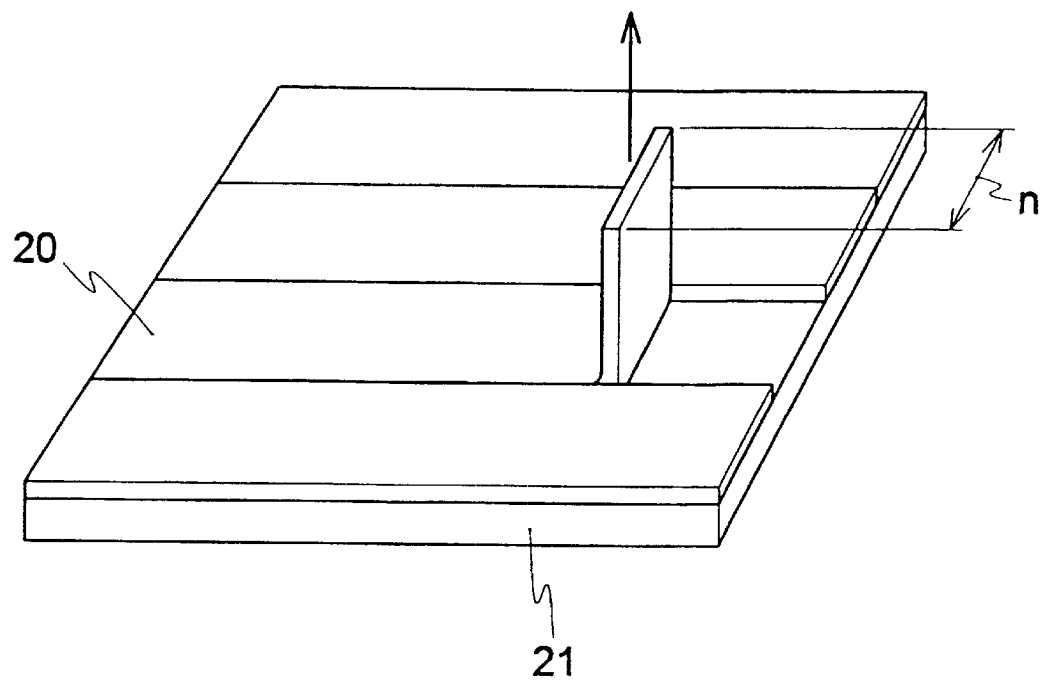
FIG. 17 is a diagrammatic perspective view of a test sample used to measure adhesive strength in (2) of Example 21 of the present invention.

FIG. 16 is a diagrammatic perspective view of an aluminum plate having a coating film obtained in (1) of Example 21. As shown in FIG. 16, the coating film 20 obtained in (1) above was cut with a cutter at intervals of a width n (10 mm) until the cutter reached the surface of the substrate, and one end of each cut strip of the coating film 20 was peeled. Thus a coated sample was obtained for measuring adhesive strength. FIG. 17 is a diagrammatic perspective view of the coated sample for measuring adhesive strength.

As shown in FIG. 17, the coating film 20 was pulled up at an angle of 90 degrees to the aluminum plate 21 and peeling strength was measured. The measurement was carried out at room temperature at a cross head speed of 50 mm/min by using TENSILON Universal Tester (the same one as in Example 7), and an average value of peel according to area method was assumed to be adhesive strength. The results are shown in Table 8.

(3) Measurement of Heat Resistance of Adhesion

A plate coated with a powder coating composition was produced separately in the same manner as in above (1), and put in a hot air dryer set at 300° C. After the lapse of 200 hours and 500 hours, the coated plate was taken out of the dryer. After the respective lapse of time, the coated plate was cooled to room temperature, and test sample was made and adhesive strength was measured in the same manner as in the above (2). The results are shown in Table 8.

COMPARATIVE EXAMPLE 18
(Heat Resistance of Adhesion of Plate Coated with Powder Coating Composition and Having Adhesive Primer Layer)
(1) Coating of Primer An aluminum plate pre-treated in the same manner as in Example 7 was coated with a heat resisting primer for a fluorine-containing resin coating composition (POLYFLON TFE Enamel EK1959DGN available from DAIKIN INDUSTRIES, LTD.) by spraying so that the coating thickness would become about 10 μm, followed by sintering at 100° C. for 10 minutes.

(2) Production of Plate Coated with Powder Coating Composition

On the primer-coated plate of above (1) was applied only a PFA powder coating composition having no functional group (the same one as in Example 21) by electrostatic coating in the same manner as in (1) of Example 21, followed by sintering at 380° C. for 20 minutes to give a coating thickness of 126 μm including the primer layer.

(3) Measurement of Adhesive Strength

The same procedures as in (2) of Example 21 were repeated. The results are shown in Table 8.

(4) Measurement of Heat Resistance of Adhesion

The same procedures as in (3) of Example 21 were repeated. The results are shown in Table 8.

EXAMPLES 22 to 23
(Heat Resistance of Adhesion of Plate Coated with PFA Powder Coating Composition Having Hydroxyl)

Plates coated with a powder coating composition were made and adhesive strength and heat resistance of adhesion were measured in the same manner as in Example 21 except that instead of the aluminum plate, a SUS430 stainless steel plate pre-treated in the same manner as in the aluminum plate (Example 22) and a galvanized steel plate subjected to only degreasing (Example 23) were used. The results are shown in Table 8.

COMPARATIVE EXAMPLES 19 to 20
(Heat Resistance of Adhesion of Plate Coated with Powder Coating Composition and Having Adhesive Primer Layer)

Plates coated with a powder coating composition were made and adhesive strength and heat resistance of adhesion were measured in the same manner as in Comparative Example 18 except that instead of the aluminum plate, a SUS430 stainless steel plate pre-treated in the same manner as in the aluminum plate (Comparative Example 19) and a galvanized steel plate subjected to only degreasing (Comparative Example 20) were used. The results are shown in Table 8.

TABLE 8

| | Ex. 21 | Ex. 22 | Ex. 23 | Com. Ex. 18 | Com. Ex. 19 | Com. Ex. 20 |
|---|---|---|---|---|---|---|
| Laminated article | | | | | | |
| Appearance | Transparent coating film | Transparent coating film | Transparent coating film | Brown | Brown | Brown |
| Substrate | Aluminum | SUS430 | Galvanized steel plate | Aluminum | SUS430 | Galvanized steel plate |
| Surface layer | Film of PFA powder coating composition having no OH group[1] | Film of PFA powder coating composition having no OH group[1] | Film of PFA powder coating composition having no OH group[1] | Film of PFA powder coating composition having no OH group[1] | Film of PFA powder coating composition having no OH group[1] | Film of PFA powder coating composition having no OH group[1] |
| Adhesive layer | Film of PFA powder coating composition having OH group[2] | Film of PFA powder coating composition having OH group[2] | Film of PFA powder coating composition having OH group[2] | Primer for fluorine-containing resin coating[3] | Primer for fluorine-containing resin coating[3] | Primer for fluorine-containing resin coating[3] |
| Coating thickness (μm) | 140–180 | 110–140 | 150–170 | 120–140 | 100–120 | 170–200 |
| Initial adhesive strength (kgf/cm) | 1.7 | 1.6 | not less than 2.0 (breakage of coating film) | 2.0 | 2.0 | 0.9 |
| Heat strength of adhesion | | | | | | |
| Adhesive strength at 300° C. after 200 hours (kgf/cm) | not less than 1.6 (breakage of coating film) | 1.2 | not less than 1.5 (breakage of coating film) | 0.95 | 0.1 | 0.7 |
| Adhesive strength at 300° C. after 500 hours (kgf/cm) | not less than 1.6 (breakage of coating film) | 1.1 | 1.0 | 0.2 | not more than 0.1 | 0.4 |

[1] NEOFLON Powder Coating Composition ACX-31 available from DAIKIN INDUSTRIES, LTD.
[2] Powder coating composition obtained in Preparation Example 7
[3] POLYFLON TFE Enamel EK1959DGN available from DAIKIN INDUSTRIES, LTD.

EXAMPLE 24
(Heat Resistance of Adhesion of Laminated Plate of PFA Having Hydroxyl)

(1) Production of Laminated Plate

An aluminum plate pre-treated in the same manner as in Example 7 was used as a substrate. A PFA film having hydroxyl and obtained in Preparation Example 13 (thickness 100 μm), a PFA film having no functional group (NEOFLON PFA Film AF-0100 available from DAIKIN INDUSTRIES, LTD.) (thickness 100 μm) and a polyimide film for separation (the same one as in Example 15) were cut to the same size as the substrate.

Figure 18:
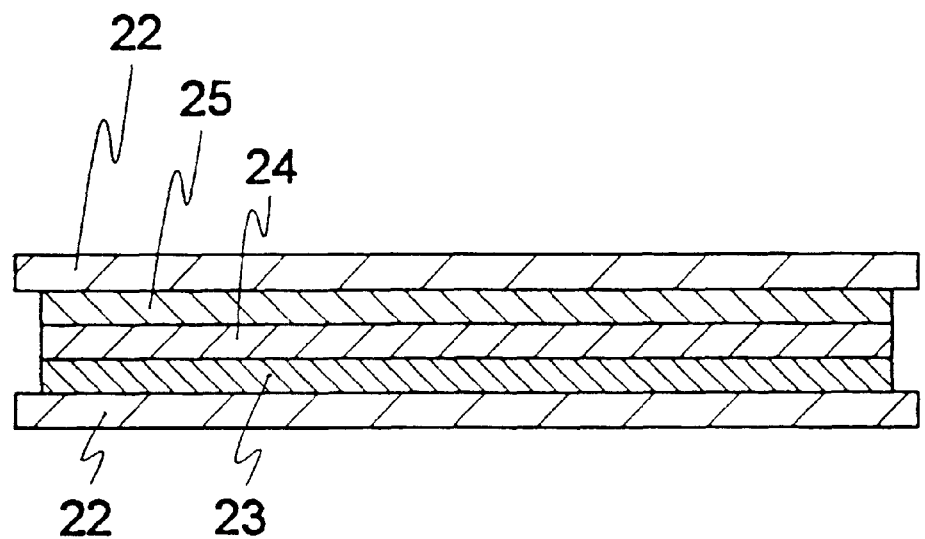
FIG. 18 is a diagrammatic cross-sectional view of a laminated test plate made in Example 24.
Figure 19:
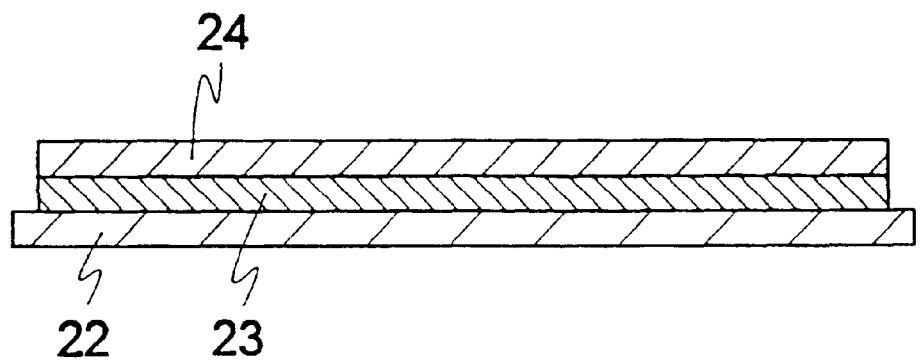
FIG. 19 is a diagrammatic cross-sectional view of a three-layered laminated article made in Example 24 of the present invention.

FIG. 18 is a diagrammatic cross-sectional view of a laminated test plate. As shown in FIG. 18, the above-mentioned hydroxyl-containing PFA film 23, PFA film 24 having no functional group and polyimide film 25 were inserted between the two aluminum plates 22 (one is a substrate), and set on a press machine preset at 350° C., followed by preheating (for 20 minutes) and then pressing at 50 kgf/cm² for one minute. After cooling, the polyimide film 25 and aluminum plate 22 contacting the polyimide film 25 were removed to give a three-layered laminated article comprising the hydroxyl-containing PFA film 23 as an adhesive layer, aluminum plate 22 and PFA film 24. FIG. 19 is a diagrammatic cross-sectional view of the obtained three-layered laminated article.

(2) Adhesive Strength

A test sample for measuring adhesive strength was produced by using the laminated plate (three-layered laminated article) obtained in above (1) instead of the plate coated with a powder coating composition and obtained in (1) of Example 21, and cutting at intervals of a width of 10 mm in the same manner as in (2) of Example 21 and peeling one end of each strip-like film from an interface between the aluminum plate and the hydroxyl-containing PFA film layer. The adhesive strength was measured by pulling up the peeled film at an angle of 90 degrees in the same manner as in (2) of Example 21. The results are shown in Table 9.

(3) Measurement of Heat Resistance of Adhesion

Another laminated plate of above (1) was produced separately, and measurement was made by using the produced laminated plate in the same manner as in (3) of Example 21. The results are shown in Table 9.

EXAMPLES 25 to 26
(Heat Resistance of Adhesion of Hydroxyl-containing PFA Laminated Plate)

Production of laminated plates and measurements of adhesive strength and heat resistance of adhesion were carried out in the same manner as in Example 24 except that instead of the aluminum plate, a SUS430 stainless steel plate pre-treated in the same manner as in the aluminum plate (Example 25) and a galvanized steel plate Subjected to only degreasing (Example 26) were used. The results are shown in Table 9.

COMPARATIVE EXAMPLE 21
(Heat Resistance of Adhesion of Laminated Plate Produced by Using Surface-treated Fluorine-containing Resin Film)

(1) Surface-treating of Fluorine-containing Resin Film

One surface of a PFA film having no functional group (NEOFLON PFA Film AF-0100 available from DAIKIN INDUSTRIES, LTD.) (thickness 100 μm) was surface-treated with TETRAETCH A (available from Kabushiki Kaisha Jyunkosha) by the method mentioned below. One surface of the PFA film (adhering surface) was wiped with acetone, and after drying, the wiped surface was coated with a solution of TETRAETCH A. After the TETRAETCH A solution was allowed to stand on the film for about 20 seconds, the film was washed with methanol and pure water and then dried. The treated surface turned brown. Further according to testing method of wettability of film described in JIS K-6768, wettability of the treated surface was determined by using a standard test solution of 40 dyn/cm. It was recognized that the surface was uniformly wet and had been treated sufficiently. Water contact angle of the treated surface was 61 degrees (110 degrees before treatment).

(2) Production of Laminated Plate

Two-liquid mixing type heat resisting epoxy adhesive (HITEMP HT-100L available from Kabushiki Kaisha Konishi) was coated on an aluminum plate pretreated in the same manner as in Example 7. The surface-treated PFA film of above (1) was cut to the same size as the substrate, and its treated surface was brought into close contact to the adhesive layer of the substrate. After heating at 120° C. for one hour, sintering was carried out at 180° C. for 20 hours for curing and adhering the film to the substrate.

(3) Measurement of Adhesive Strength

A test sample for measuring adhesive strength was produced in the same manner as in (2) of Example 24 by using the laminated plate obtained in above (2) instead of the laminated plate obtained in Example 24, and cutting at intervals of a width of 10 mm and peeling one end of each strip-like film from an interface between the PFA film and the adhesive layer. The adhesive strength was measured in the same manner as in (2) of Example 21 by pulling up the peeled film at an angle of 90 degrees to the substrate. The results are shown in Table 9.

(4) Measurement of Heat Resistance of Adhesion

Another laminated plate of above (2) was produced, and by using it, measurement was made in the same manner as in (3) of Example 21. The results are shown in Table 9.

COMPARATIVE EXAMPLES 22 to 23
(Heat Resistance of Adhesion of Laminated Plate Produced by Using Surface-treated Fluorine-containing Resin Film)

Surface-treating of a fluorine-containing resin film, production of laminated plates and measurements of adhesive strength and heat resistance of adhesion were carried out in the same manner as in Comparative Example 21 except that instead of the aluminum plate, a SUS430 stainless steel plate surface-treated in the same manner as in the aluminum plate (Comparative Example 22) and a galvanized steel plate subjected to only degreasing (Comparative Example 23) were used. The results are shown in Table 9.

COMPARATIVE EXAMPLE 24
(Heat Resistance of Adhesion of Laminated Article Produced by Using Surface-treated Film)

(1) Surface Treatment of Fluorine-containing Resin Film

A surface-treated FEP film (NEOFLON FEP Film NF-0100B1 available from DAIKIN INDUSTRIES, LTD., one side is surface-treated) (thickness 100μm) was used instead of the PFA film of (1) of Comparative Example 21 surface-treated with TETRAETCH.

(2) Production of Laminated Plate

An epoxy adhesive was coated on a pre-treated aluminum plate and a surface-treated film was laminated on the coated aluminum plate in the same manner as in (2) of Comparative Example 21 except that the surface-treated FEP film of above (1) was used instead of the PFA film surface-treated with TETRAETCH.

(3) Measurement of Adhesive Strength

Production of a test sample and measurement of adhesive strength were carried out in the same manner as in Comparative Example 21 except that the laminated plate obtained in above (2) was used instead of the laminated plate which was produced by using PFA film treated with TETRAETCH in (2) of Comparative Example 21.

(4) Measurement of Heat Resistance of Adhesion

Another laminated plate of above (2) was produced, and by using it, measurement was carried out in the same manner as in (3) of Example 21. The results are shown in Table 9.

COMPARATIVE EXAMPLE 25 to 26

(Heat Resistance of Adhesion of Laminated Plate Produced by Using Surface-treated Fluorine-containing Resin Film)

Production of laminated plates, and measurements of adhesive strength and heat resistance of adhesion were carried out in the same manner as in Comparative Example 24 except that instead of the aluminum plate, a SUS430 stainless steel plate surface-treated in the same manner as in the aluminum plate (Comparative Example 25) and a galvanized steel plate subjected to only degreasing (Comparative Example 26 were used. The results are shown in Table 9.

TABLE 9

| | Ex. 24 | Ex. 25 | Ex. 26 | Com. Ex. 21 | Com. Ex. 22 | Com. Ex. 23 |
|---|---|---|---|---|---|---|
| Laminated article | | | | | | |
| Appearance | Transparent coating film | Transparent coating film | Transparent coating film | Brown | Brown | Brown |
| Substrate | Aluminum | SUS430 | Galvanized steel plate | Aluminum | SUS430 | Galvanized steel plate |
| Surface layer | Powder coating film of PFA having no OH group[1] | Powder coating film of PFA having no OH group[1] | Powder coating film of PFA having no OH group[1] | PFA film surface-treated with TETRAETCH | PFA film surface-treated with TETRAETCH | PFA film surface-treated with TETRAETCH |
| Adhesive layer | PFA film having OH group[2] | PFA film having OH group[2] | PFA film having OH group[2] | Heat resisting epoxy adhesive[3] | Heat resisting epoxy adhesive[3] | Heat resisting epoxy adhesive[3] |
| Coating thickness (μm) | 180–220 | 170–200 | 200–230 | 150–190 | 160–190 | 170–190 |
| Initial adhesive strength (kgf/cm) | 2.1 | 2.5 | 2.2 | 1.6 | 1.0 | 1.6 |
| Thermal strength of adhesion | | | | | | |
| Adhesive strength at 300° C. after 200 hours (kgf/cm) | not less than 2.0 (breakage of film) | 2.2 | not less than 2.0 (breakage of film) | Spontaneous peeling (peeling at substrate side) | Spontaneous peeling (peeling at substrate side) | Spontaneous peeling (peeling at substrate side) |
| Adhesive strength at 300° C. after 500 hours (kgf/cm) | not less than 2.0 (breakage of film) | not less than 1.6 (breakage of film) | not less than 2.0 (breakage of film) | Spontaneous peeling (peeling at substrate side) | Spontaneous peeling (peeling at substrate side) | Spontaneous peeling (peeling at substrate side) |

| | Com. Ex. 24 | Com. Ex. 25 | Com. Ex. 26 |
|---|---|---|---|
| Laminated article | | | |
| Appearance | Brown | Brown | Brown |
| Substrate | Aluminum | SUS430 | Galvanized steel plate |
| Surface layer | Surface-treated FEP film[4] | Surface-treated FEP film[4] | Surface-treated FEP film[4] |
| Adhesive layer | Heat resistive epoxy adhesive[3] | Heat resistive epoxy adhesive[3] | Heat resistive epoxy adhesive[3] |
| Coating thickness (μm) | 130–160 | 160–180 | 160–180 |
| Initial adhesive strength (kgf/cm) | 1.5 | 1.5 | 1.5 |
| Thermal strength of adhesion | | | |
| Adhesive strength at 300° C. after 200 hours (kgf/cm) | Spontaneous peeling (peeling at substrate side) | Spontaneous peeling (peeling at substrate side) | Spontaneous peeling (peeling at substrate side) |
| Adhesive strength at 300° C. after | Spontaneous peeling (peeling at substrate | Spontaneous peeling (peeling at substrate | Spontaneous peeling (peeling at substrate |

TABLE 9-continued

| | 500 hours (kgf/cm) | side) | side) | side) |
|---|---|---|---|---|

[1] NEOFLON PFA Film AF-0100 available from DAIKIN INDUSTRIES, LTD.
[2] Film obtained in Preparation Example 13
[3] HITEMP HT-100L available from Kabushiki Kaisha Konishi
[4] NEOFLON FEP Film NF-0100B1 available from DAIKIN INDUSTRIES, LTD.

INDUSTRIAL APPLICABILITY

According to the present invention, it is possible to obtain a composite material for office automation equipment which is produced by applying, to a substrate, a material comprising a fluorine-containing polymer having excellent adhesive property, without necessitating complicated steps. Further according to the present invention, it is possible to obtain a composite material for office automation equipment which is excellent in heat resistance, non-sticking property, stain-proofing property, water- and oil-repelling property, stain removing property, chemical resistance, rust-preventive property, antibacterial property, resistance to energy ray and friction resistance.

What is claimed is:

1. A composite material for office automation equipment which is produced by applying, to an office automation equipment substrate, a material comprising a fluorine-containing ethylenic polymer having functional group and prepared by copolymerizing;
   (a) 0.05 to 30% by mole of at least one of fluorine-containing ethylenic monomers having at least one functional group selected from the group consisting of hydroxyl, carboxyl, a carboxylic salt group and epoxy, and
   (b) 70 to 99.95% by mole of any one of fluorine-containing ethylenic monomers and monomer mixtures having no functional group selected from the group consisting of tetrafluoroethylene, a monomer mixture of 85 to 99.7% by mole of tetrafluoroethylene and 0.3 to 15% by mole of a monomer represented by the formula (2):

$$CF_2=CF-R_f^1 \quad (2)$$

wherein $R_f^1$ is $CF_3$ or $OR_f^2$, in which $R_f^2$ is a perfluoroalkyl group having 1 to 5 carbon atoms and a monomer mixture of 40 to 80% by mole of tetrafluoroethylene, 20 to 60% by mole of ethylene and 0 to 15% by mole of a monomer copolymerizable therewith, said composite material has a non-sticking property and heat resistance of adhesion at an elevated temperature to the substrate.

2. The composite material for office automation equipment of claim 1 which is produced by applying, to the substrate, the fluorine-containing ethylenic polymer having functional group, wherein said fluorine-containing ethylenic monomer (a) having functional group is at least one of fluorine-containing ethylenic monomers having functional group and represented by the formula (1):

$$CX_2=CX^1-R_f-Y \quad (1)$$

wherein Y is $-CH_2OH$, $-COOH$, a carboxylic salt group or epoxy, X and $X^1$ are the same or different and each is hydrogen atom or fluorine atom, $R_f$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

3. The composite material for office automation equipment of claim 1, in which the fluorine-containing ethylenic polymer having functional group is applied to the substrate in the form of a coating composition.

4. The composite material for office automation equipment of claim 1, in which the fluorine-containing ethylenic polymer having functional group is applied to the substrate in the form of a film.

5. The composite material for office automation equipment of claim 1, wherein the substrate is a metallic substrate and said material is applied to the substrate through a layer of elastic member.

6. The composite material for office automation equipment of claim 5, wherein the layer of elastic member comprises a silicone or a fluorine-containing rubber.

7. The composite material for office automation equipment of claim 1, wherein the substrate is at least one selected from the group consisting of polyimide, polyphenylene sulfide, polyamide imide and polyetherimide.

8. Rollers for office automation equipment comprising a composite material prepared by applying, to office automation equipment roller substrates, a material comprising a fluorine-containing ethylenic polymer having functional group and prepared by copolymerizing;
   (a) 0.05 to 30% by mole of at least one of fluorine-containing ethylenic monomers having at least one functional group selected from the group consisting of hydroxyl, carboxyl, a carboxylic salt group and epoxy, and
   (b) 70 to 99.95% by mole of any one of fluorine-containing ethylenic monomers and monomer mixtures having no functional group selected from the group consisting of tetrafluoroethylene, a monomer mixture of 85 to 99.7% by mole of tetrafluoroethylene and 0.3 to 15% by mole of a monomer represented by the formula (2):

$$CF_2=CF-R_f^1 \quad (2)$$

wherein $R_f^1$ is $CF_3$ or $OR_f^2$, in which $R_f^2$ is a perfluoroalkyl group having 1 to 5 carbon atoms and a monomer mixture of 40 to 80% by mole of tetrafluoroethylene, 20 to 60% by mole of ethylene and 0 to 15% by mole of a monomer copolymerizable therewith, said composite material has a non-sticking property and heat resistance of adhesion at an elevated temperature to the substrate.

9. The rollers for office automation equipment of claim 8, wherein said fluorine-containing ethylenic polymer having functional group is applied to the substrate in the form of a coating composition.

10. The rollers for office automation equipment of claim 8, wherein said fluorine-containing ethylenic polymer having functional group is applied to the substrate in the form of a tube.

11. Belts for office automation equipment comprising a composite material prepared by applying, to office automation equipment belt substrates, a material comprising a fluorine-containing ethylenic polymer having functional group and prepared by copolymerizing;

(a) 0.05 to 30% by mole of at least one of fluorine-containing ethylenic monomers having at least one functional group selected from the group consisting of hydroxyl, carboxyl, a carboxylic salt group and epoxy, and (b) 70 to 99.95% by mole of any one of fluorine-containing ethylenic monomers and monomer mixtures having no functional group selected from the group consisting of tetrafluoroethylene, a monomer mixture of 85 to 99.7% by mole of tetrafluoroethylene and 0.3 to 15% by mole of a monomer represented by the formula (2):

$CF_2=CF—R_f^1$ (2)

wherein $R_f^1$ is $CF_3$ or $OR_f^2$, in which $R_f^2$ is a perfluoroalkyl group having 1 to 5 carbon atoms and a monomer mixture of 40 to 80% by mole of tetrafluoroethylene, 20 to 60% by mole of ethylene and 0 to 15% by mole of a monomer copolymerizable therewith, said composite material has a non-sticking property and heat resistance of adhesion at an elevated temperature to the substrate.

12. The belts for office automation equipment of claim 11, wherein said fluorine-containing ethylenic polymer having functional group is applied to the substrate in the form of a coating composition.

13. The belts for office automation equipment of claim 11, wherein said fluorine-containing ethylenic polymer having functional group is applied to the substrate in the form of a film.

14. The belts for office automation equipment of claim 11, wherein the substrate is polyimide.

15. A transfer belt for office automation equipment comprising a composite material prepared by applying, to an office automation equipment transfer belt substrate, a material comprising a fluorine-containing ethylenic polymer having functional group and prepared by copolymerizing;

(a) 0.05 to 30% by mole of at least one of fluorine-containing ethylenic monomers having at least one functional group selected from the group consisting of hydroxyl, carboxyl, a carboxylic salt group and epoxy, and (b) 70 to 99.95% by mole of any one of fluorine-containing ethylenic monomers and monomer mixtures having no functional group selected from the group consisting of tetrafluoroethylene, a monomer mixture of 85 to 99.7% by mole of tetrafluoroethylene and 0.3 to 15% by mole of a monomer represented by the formula (2):

$CF_2=CF—R_f^1$ (2)

wherein $R_f^1$ is $CF_3$ or $OR_f^2$, in which $R_f^2$ is a perfluoroalkyl group having 1 to 5 carbon atoms and a monomer mixture of 40 to 80% by mole of tetrafluoroethylene, 20 to 60% by mole of ethylene and 0 to 15% by mole of a monomer copolymerizable therewith, said composite material has a non-sticking property and heat resistance of adhesion at an elevated temperature to the substrate.

16. Sliding parts for office automation equipment comprising a composite material prepared by applying, to office automation equipment sliding part substrates, a material comprising a fluorine-containing ethylenic polymer having functional group and prepared by copolymerizing;

(a) 0.05 to 30% by mole of at least one of fluorine-containing ethylenic monomers having at least one functional group selected from the group consisting of hydroxyl, carboxyl, a carboxylic salt group and epoxy, and (b) 70 to 99.95% by mole of any one of fluorine-containing ethylenic monomers and monomer mixtures having no functional group selected from the group consisting of tetrafluoroethylene, a monomer mixture of 85 to 99.7% by mole of tetrafluoroethylene and 0.3 to 15% by mole of a monomer represented by the formula (2):

$CF_2=CF—R_f^1$ (2)

wherein $R_f^1$ is $CF_3$ or $OR_f^2$, in which $R_f^2$ is a perfluoroalkyl group having 1 to 5 carbon atoms and a monomer mixture of 40 to 80% by mole of tetrafluoroethylene, 20 to 60% by mole of ethylene and 0 to 15% by mole of a monomer copolymerizable therewith, said composite material has a non-sticking property and heat resistance of adhesion at an elevated temperature to the substrate.

17. The sliding parts for office automation equipment of claim 16, wherein said fluorine-containing ethylenic polymer having functional group is applied to the substrate in the form of a coating composition.

18. The sliding parts for office automation equipment of claim 16, wherein said substrate is made of polyphenylene sulfide, polyamide imide or polyetherimide.

19. The rollers for office automation equipment of claim 8, wherein the roller is one selected from the group consisting of a fuser roller, a pressure roller, a charging roller and a transfer roller.

20. The composite material for office automation equipment of claim 1, wherein the office automation equipment is one selected from the group consisting of a separating claw, a fixing bearing, a paper delivery roller and a paper delivery guide.

21. The composite material for office automation equipment of claim 1, wherein said composite material has an adhesive strength of not less than 1.2 kgf/cm after being subjected to a temperature of 300° C. for 200 hours.

22. The composite material for office automation equipment of claim 1, wherein said composite material has an adhesive strength of not less then 1.0 kgf/cm after being subjected to a temperature of 300° C. for 500 hours.

* * * * *